United States Patent
Tamaki et al.

(10) Patent No.: US 8,942,117 B2
(45) Date of Patent: Jan. 27, 2015

(54) WIRELESS COMMUNICATION SYSTEM, INTEGRATED BASE STATION, AND TERMINAL

(75) Inventors: Tsuyoshi Tamaki, Machida (JP); Takashi Yano, Tokorozawa (JP); Yunjian Jia, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 614 days.

(21) Appl. No.: 13/266,284

(22) PCT Filed: Apr. 27, 2009

(86) PCT No.: PCT/JP2009/058288
§ 371 (c)(1),
(2), (4) Date: Nov. 18, 2011

(87) PCT Pub. No.: WO2010/125635
PCT Pub. Date: Nov. 4, 2010

(65) Prior Publication Data
US 2012/0087265 A1    Apr. 12, 2012

(51) Int. Cl.
*H04L 12/26* (2006.01)
*H04W 92/20* (2009.01)
*H01Q 1/24* (2006.01)
(Continued)

(52) U.S. Cl.
CPC .............. *H04W 92/20* (2013.01); *H01Q 1/246* (2013.01); *H04B 7/024* (2013.01); *H04B 7/0452* (2013.01); *H04B 7/0626* (2013.01); *H04B 7/0639* (2013.01); *H04B 7/0645* (2013.01); *H04W 24/00* (2013.01); *H04W 24/10* (2013.01); *H04W 28/04* (2013.01); *H04W 48/18* (2013.01);
(Continued)

(58) Field of Classification Search
CPC ..................................................... H04L 1/0048
USPC .............................. 370/252, 328; 455/25, 73
See application file for complete search history.

(56) References Cited

U.S. PATENT DOCUMENTS

2005/0002358 A1    1/2005  Miyoshi et al.
2005/0135312 A1*   6/2005  Montojo et al. .............. 370/335
(Continued)

FOREIGN PATENT DOCUMENTS

CN    1386351 A    12/2002
CN    1838565 A     9/2006
(Continued)

OTHER PUBLICATIONS

Chinese Office Action received in Chinese Application No. 200980158880.2 dated Dec. 19, 2013.
(Continued)

*Primary Examiner* — Wanda Z Russell
(74) *Attorney, Agent, or Firm* — Mattingly & Malur, PC

(57) ABSTRACT

A frame time having a certain period of time is divided into: a time period (for inter-base-station time division multiplex communication) in which one of the base stations has a transmission right in the simultaneous transmission and carries out inter-base-station time division multiplex communication so as to avoid interference between the base stations; and a time period (for inter-base-station simultaneous communication) for communication which is simultaneously carried out between the plurality of base stations. Furthermore, the time periods are switched for the communication.

14 Claims, 21 Drawing Sheets

(51) Int. Cl.
*H04B 7/02* (2006.01)
*H04B 7/04* (2006.01)
*H04B 7/06* (2006.01)
*H04W 24/00* (2009.01)
*H04W 24/10* (2009.01)
*H04W 28/04* (2009.01)
*H04W 48/18* (2009.01)
*H04W 88/06* (2009.01)
*H04W 88/08* (2009.01)

(52) U.S. Cl.
CPC .............. *H04W 88/06* (2013.01); *H04W 88/08* (2013.01); *H04B 7/0465* (2013.01)
USPC ................ 370/252; 370/328; 455/25; 455/73

(56) References Cited

U.S. PATENT DOCUMENTS

| | | |
|---|---|---|
| 2006/0217158 A1 | 9/2006 | Uwano et al. |
| 2008/0101322 A1* | 5/2008 | Prakash et al. ................ 370/342 |
| 2009/0190546 A1 | 7/2009 | Makino |
| 2011/0134848 A1 | 6/2011 | Tamaki |
| 2011/0206153 A1* | 8/2011 | Zheng et al. ................ 375/267 |
| 2012/0027120 A1* | 2/2012 | Noh et al. ..................... 375/295 |

FOREIGN PATENT DOCUMENTS

| | | |
|---|---|---|
| JP | 2002-44168 A | 2/2002 |
| JP | 2002-261772 A | 9/2002 |
| JP | 2006-270216 A | 10/2006 |
| KR | 20080032744 A | 4/2008 |
| WO | 2008041291 A1 | 4/2008 |

OTHER PUBLICATIONS

M. Costa, Writing on Dirty Paper, IEEE Trans. Inform. Theory, vol. 29, Issue 3, May 1983, pp. 440, Figure 1: Variation of Gaussian-Shannon channel.

W. Yu et al., Sum capacity of Gaussian vector broadcast channels, IEEE Trans. Inform Theory, vol. 50, No. 9, pp. 1875-1892, Sep. 2004.

S. Shamai et al., Enhancing the Cellular Downlink Capacity via Co-Processing at the Transmitting End, Proceedings of IEEE Vehicular Tech. Conf., May 2001 to Spring, pp. 1745-1749.

T. Ohgane et al., Applications of Space Division Multiplexing and Those Performance in a MIMO Channel, The Institute of Electronics, Information and Communication Engineers, B, vol. J87_B No. 9, Sep. 2004.

3GGP (3rd Generation Partnership Project), TR_36.814_041: Technical Specification Group Radio Access Network; Further Advancements for E-UTRA, Physical Layer Aspects, V9.0.0, Mar. 2010.

\* cited by examiner

FIG. 3
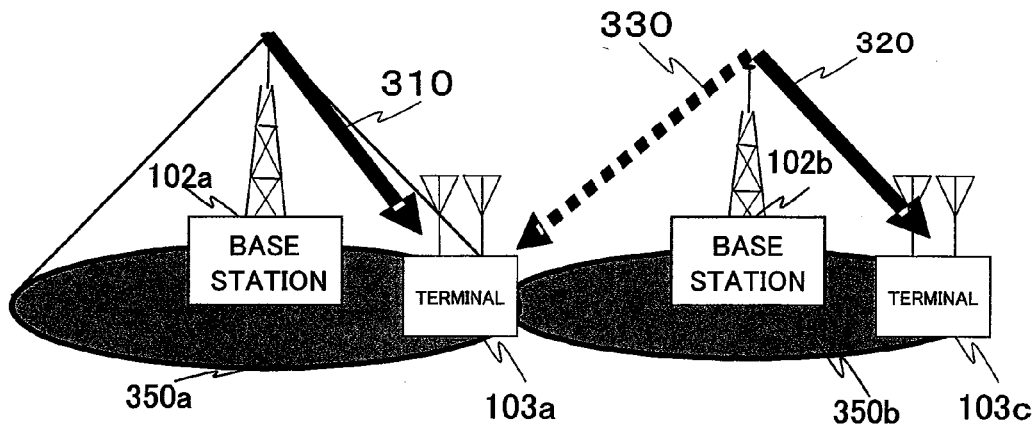
(1) INTER-BASE-STATION TIME DIVISION MULTIPLEX (SINGLE-USER/MULTI-USER MIMO)
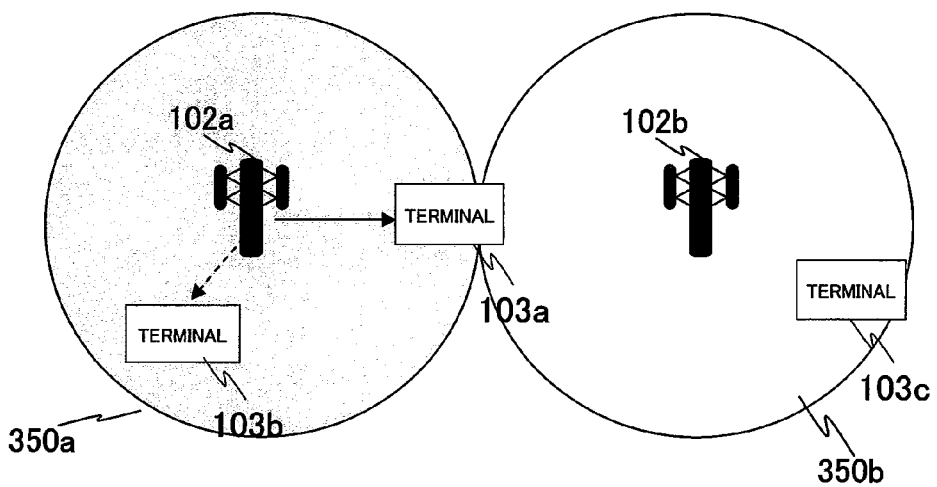
(2) INTER-BASE-STATION FREQUENCY DIVISION MULTIPLEX (SINGLE-USER/MULTI-USER MIMO)
(3) INTER-BASE-STATION SPATIAL DIVISION MULTIPLEX (SINGLE-USER/MULTI-USER MIMO)
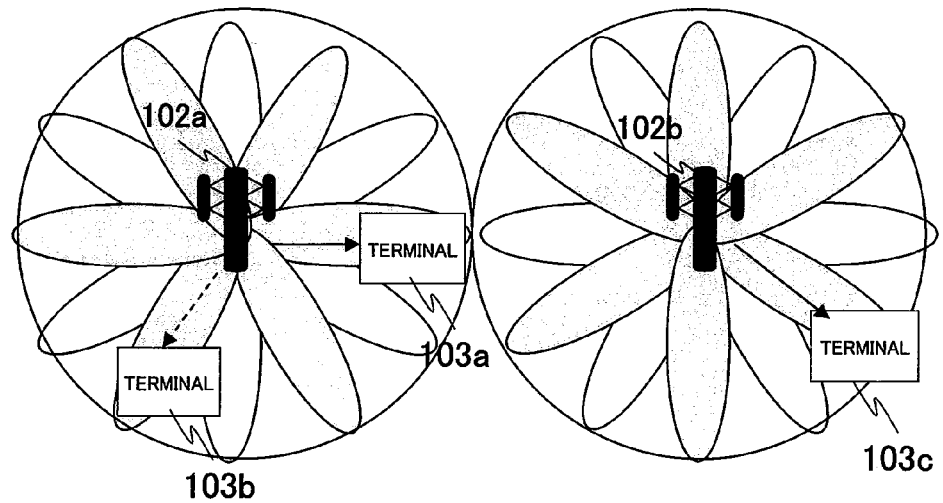

FIG. 4
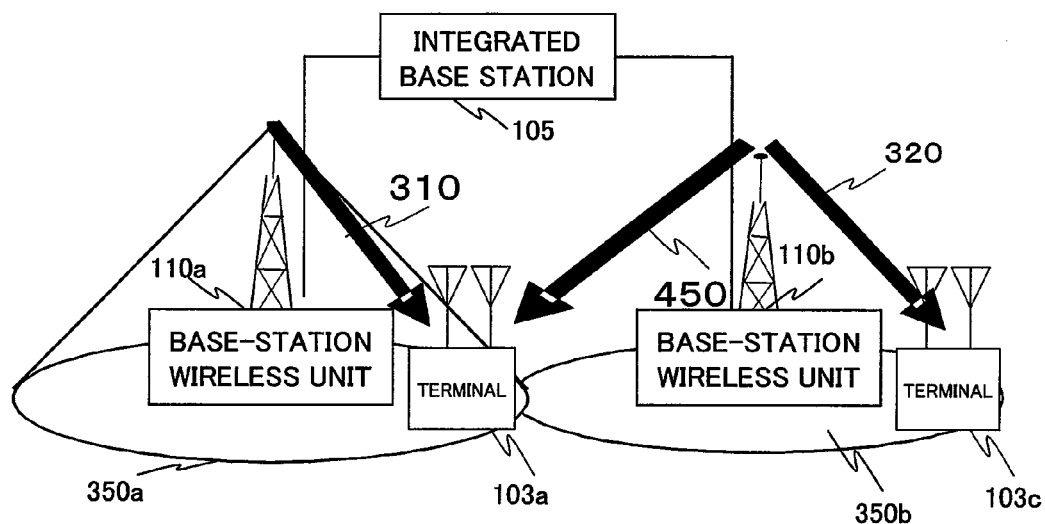
(1) INTER-BASE-STATION COOPERATED SINGLE-USER MIMO (CoMP-SU-MIMO)
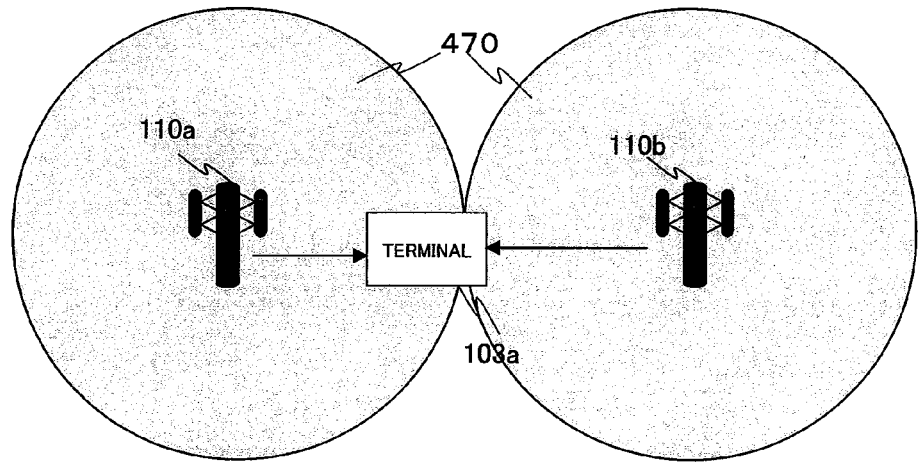
(2) INTER-BASE-STATION COOPERATED MULTI-USER MIMO (CoMP-MU-MIMO)
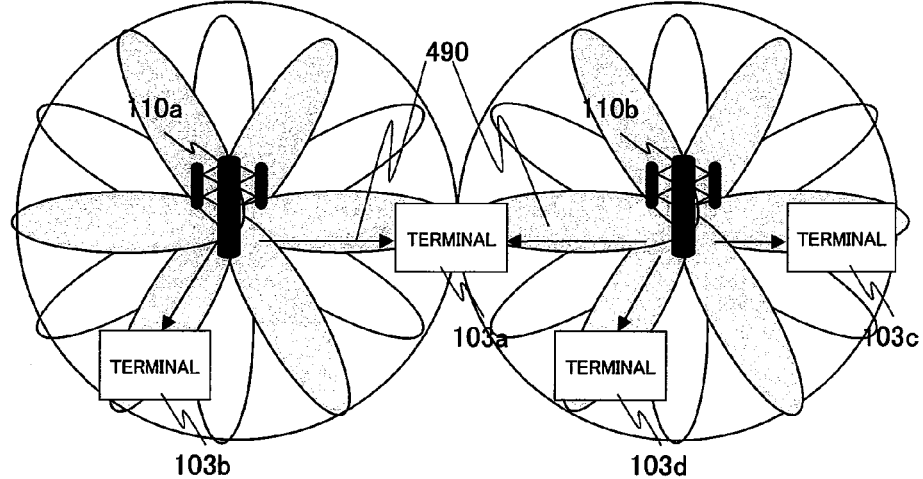

WIRELESS COMMUNICATION SYSTEM, INTEGRATED BASE STATION, AND TERMINAL

TECHNICAL FIELD

The present invention relates to a method of carrying out data transmission/reception between a plurality of base stations having a plurality of transmitting/receiving antennas and a plurality of tributary terminals of the respective base stations in a wireless communication system.

BACKGROUND ART

In recent years, along with increasing speed of a wireless communication system, a MIMO (Multiple Input Multiple Output) technique of transmitting data from a plurality of antennas and receiving data by a plurality of antennas has been employed to many wireless standards of wireless LAN, mobile communication, and others, from a viewpoint of improving a frequency utilization efficiency.

In one-to-one wireless communication (Point to Point) between one transmitting station and one receiving station, an eigenmode propagation method which is disclosed in Non-Patent Document 4 is known as a method of maximally bringing out a communication capacity provided by a wireless propagation path. In this eigenmode propagation method, the capacity provided by the propagation path is maximally brought out by carrying out the eigendecomposition (Singular Value Decomposition) to a channel matrix H as a property of the wireless propagation path between the transmitting/receiving antennas and carrying out the weighted calculation to a matrix obtained by the eigendecomposition with a transmitting vector signal and a receiving vector signal. In a system that quasi-static environment is assumed such that a user does not move so much as a wireless LAN, variation of the wireless propagation path is small, and therefore, this method is suitable.

From a viewpoint of information theories, many studies have been made for a communication capacity of one-to-N wireless communication (BC: Broadcast Channel) having "N" receiving stations for one transmitting station and a communication capacity of M-to-one wireless communication (MAC: Multiple Access Channel) having one receiving station for "M" transmitting stations. Regarding the communication capacity of the Broadcast Channel, "Dirty Paper Coding" has been introduced as a method of providing an upper limit of a system capacity in Non-Patent Document 1, and Non-Patent Document 2 has proven that a method of maximally bringing out the capacity exists.

And, Non-Patent Document 3 discloses an idea of a method of improving the throughput of the entire system by the coordinated cooperation of a plurality of transmitting stations to apparently increase the total number of antennas on the transmitting-station side and carrying out the above-described Dirty Paper Coding.

In a conventional wireless communication system, methods in simultaneous transmission from a base station to a terminal are known, a method of dividing frequencies among adjacent base stations (FDMA: Frequency Division Multiple Access) and reusing the frequencies at distant locations by designing a cell structure, and a method of CDMA (Code Division Multiple Access) in which, even when a plurality of base stations carry out the transmission at the same frequency, the transmission is multiplexed by a code, and a signal is extracted by the same code on the receiving side. Also, a method of time-dividing a plurality of base stations (TDMA: Time Division Multiple Access) is known. Further, in recent years, as disclosed in the above-described documents, an idea of a method of carrying out the communication with a plurality of terminals by spatial division (SDMA: Space Division Multiple Access) by the cooperation of the plurality of base stations has been also disclosed. These multiple access techniques are determined and operated based on a standard of a system.

In a next-generation standard of cellular communication, as disclosed in Non-Patent Document 5, an idea of coordinated communication between a plurality of base stations, which carries out the transmission by the cooperation of the plurality of base stations, has been disclosed.

PRIOR ART DOCUMENTS

Non-Patent Documents

Non-Patent Document 1: "Writing on dirty paper", "IEEE Trans. Inform. Theory, vol. 29, issue 3", "May 1983", "written by M. Costa", "published by IEEE", "p. 440, FIG. 1: Variation of Gaussian-Shannon channel"

Non-Patent Document 2: W. Yu and J. M. Cioffi, "Sum capacity of Gaussian vector broadcast channels", IEEE Trans. Inform. Theory, Vol. 50, No. 9, pp. 1875 to 1892, September 2004

Non-Patent Document 3: S. Shamai and B. Zaidel, "Enhancing the cellular downlink capacity via co-processing at the transmitting end", in Proceedings of IEEE Vehicular Tech. Conf., May 2001 to Spring, pp. 1745 to 1749

Non-Patent Document 4: "Applications of Space Division Multiplexing and Those Performance in a MIMO channel", "The Institute of Electronics, Information and Communication Engineers, B, Vol. J87_B No. 9", "September 2004", "published by The Institute of Electronics, Information and Communication Engineers", "written by Takeo Ohgane, Toshihiko Nishimura, and Yasutaka Ogawa"

Non-Patent Document 5: 3GPP (3rd Generation Partnership Project) TR_36.814_041: Technical Specification Group Radio Access Network; Further Advancements for E-UTRA, Physical Layer Aspects

DISCLOSURE OF THE INVENTION

In Non-Patent Document 4, the channel information measured on the receiving side is fed back to the transmitting side. Therefore, when the variation of the wireless propagation path is large, there is a demerit that the communication performance is deteriorated since the actual channel state upon the communication is different from the fed-back channel state.

In the one-to-N BC: Broadcast Channel in Non-Patent Document 2, as compared with the one-to-one eigenmode propagation method disclosed in Non-Patent Document 4, the total number of antennas on the receiving side is increased as increasing the number of users, and therefore, the communication capacity which can be provided in the entire system is increased.

The disclosures of Non-Patent Documents 2 and 4 are not established unless the channel information formed in the space between the transmission/reception sides is instantaneously recognized on the transmitting side. In an actual system, the channel information is measured on the receiving side, and the notification of the channel information is carried out with using a feedback link from the receiving side to the transmitting side. The channel is varied during delay time taken for this feedback, and therefore, the performance is largely deteriorated, and it is difficult to achieve means of the disclosures.

Further, in the communication capacity of the one-to-N Broadcast Channel, the communication capacity which can be provided is limited by restrictions on the number of antennas of the transmitting station.

Also, Non-Patent Document 5 does not disclose a clear communication procedure indicating either that the coordinated communication among the plurality of base stations is always operated or that the communication between one base station and its tributary terminal is conventionally carried out. In the above-described inter-base-station coordinated communication method, which carries out the simultaneous communication with the plurality of terminals by the cooperation of the plurality of base stations, there is a possibility of increasing the capacity which can be provided by the system. On the other hand, by the increase in the number of terminals or the number of transmitting/receiving antennas simultaneously handled by the system, an amount of the channel information communicated between the transmission/reception sides is increased, the overhead for feeding back the channel information measured at the terminals is increased, and therefore, the practical increase in the throughput is not obtained in some cases. The terminals have various pieces of information such as a stopping channel and a moving channel. Therefore, in order to always newly maintain the channel information which is momentarily varied, it is required to carry out this feedback at an appropriate timing.

Also, when the amount of the communication traffic requested by the terminals is not large, the request is satisfied in some cases even by the conventional communication method of carrying out the communication between a single base station and one or the plurality of terminals even if the base stations are not cooperated, and therefore, the coordinated communication by the plurality of base stations is not always required.

With assuming a wireless system using a plurality of transmitting/receiving antennas, a preferred aim is to provide a communication method of selecting an optimal communication mode as satisfying communication speed requested by terminals. Also, for the problem of the increase in the feedback amount when the communication method is switched, a preferred aim is to provide a method of decreasing the feedback amount so as to provide a communication method of preventing decrease in the frequency utilization efficiency.

In order to solve at least one of the above-described problems, there is provided a method of dividing frame time having a certain period of time into: a time period (for inter-base-station time division multiplex communication) for inter-base-station time division multiplex communication as avoiding interference between the base stations and providing a transmission right in simultaneous communication to one of base stations to carry out the communication; and a time period (for inter-base-station simultaneous communication) for simultaneous communication among the plurality of base stations. The time period for the inter-base-station simultaneous communication is further divided so as to provide: a time period (for interference avoiding inter-base-station simultaneous communication) for a communication in a spatially-divided state that mutual interference among the plurality of base stations is ignorably small even when signals are simultaneously transmitted among the plurality of base stations; and a time period (for inter-base-station coordinated communication) for communication, if the interference is not ignorable, as providing not the interference but a desired wave by collecting antennas of the plurality of base stations so as to be regarded as one large base station to carry out a signal processing across the plurality of base stations.

For the problem of the increase in the feedback amount, all of the channel information between the plurality of antennas of the plurality of base stations and the plurality of antennas of the plurality of terminals is not fed back. Alternatively, the terminal is previously notified of the information, which is required for judging whether the information is to be fed back or not, via the base station, and autonomously judges whether the information is to be fed back or not. If it is required to be fed back, the information is fed back, and, if not required, the feedback is not carried out.

Also, when the feedback is carried out from the terminal to the base station, by calculating the communication speed estimated when the terminal carries out the inter-base-station time division multiplex communication, the interference avoiding inter-base-station simultaneous communication, or the inter-base-station coordinated communication, and judging whether this estimated communication speed satisfies the requested speed or not, a desired communication method is selected, the base station side is notified of the method, a final communication method is determined on the base station side by the channel information and the desired communication method collected from the plurality of terminals, and the terminal is notified of the communication method, so that the communication is carried out in accordance with the determined communication method.

From the acknowledgment of the information of feedback judgment, the terminal autonomously determines whether the feedback information is to be transmitted or not, so that the feedback amount provided when the number of terminals is increased can be decreased. On the base station side, by resetting a threshold value of the information of the feedback judgement, the feedback information can be obtained more from the terminals, or, conversely, can be reduced. In consideration of a tradeoff relationship between the situation of the desired feedback precision and the amount of the feedback information, the feedback amount can be controlled on the base station side.

Also, instead of relying on the base station side alone for all of the processes to determine any of the communication methods of the inter-base-station time division multiplex communication, the interference avoiding inter-base-station simultaneous communication, and the inter-base-station coordinated communication, the estimated communication speed in each communication method is obtained on the terminal side, and the judgment whether the speed satisfies the requested communication speed or not is carried out by the distributed processing, so that the calculation time for determining the communication method on the base station side can be significantly reduced. In this manner, the communication methods can be switched at a short control cycle, and therefore, the followability for the channel variation can be improved, and the performance deterioration can be prevented.

BRIEF DESCRIPTIONS OF THE DRAWINGS

FIG. 3 is an explanatory diagram of an inter-base-station interference avoiding communication;

FIG. 4 is an explanatory diagram of an inter-base-station interference utilizing communication;

DESCRIPTION OF THE EMBODIMENTS

Figure 1:
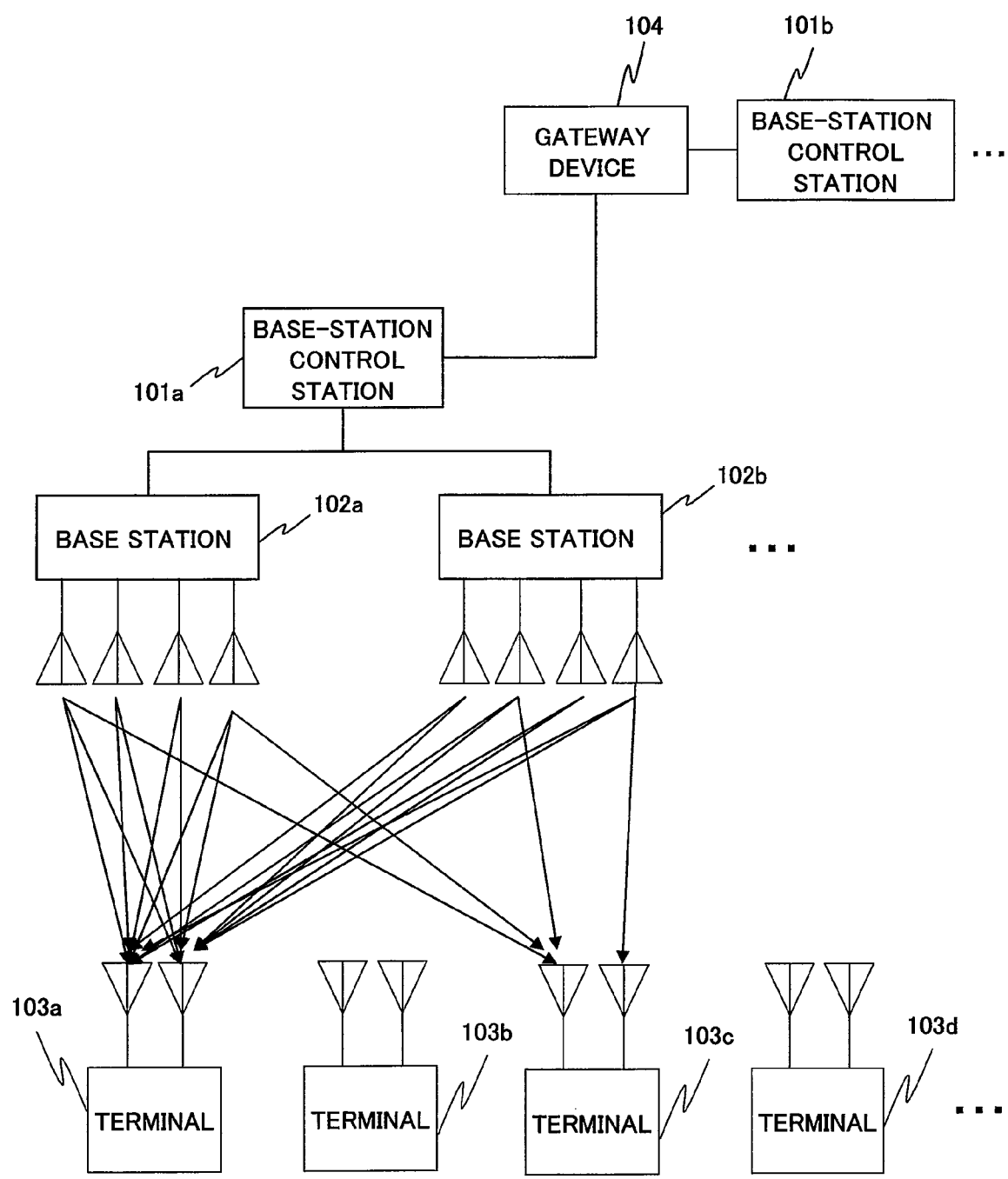
FIG. 1 is a wireless system entire configuration according to an embodiment of the present invention.

With respect to FIG. 1, a wireless system entire configuration is explained. A base-station control station 101a controls belonging base stations 102a, 102b, and . . . to achieve the coordinated cooperating communication among the base stations. An example of FIG. 1 shows a state that the base station 102a and the base station 102b carry out the inter-base-station coordinated communication to transmit a data to terminals 103a and 103c at a certain point of time. The terminals 103a and 103c separate a desired signal to carry out a receiving processing. At this time, the base-station control station forms a transmitting signal for inter-base-station coordinated transmission, and acquires the channel information for total four receiving antennas of the terminals 103a and 103c with using total eight transmitting antennas of the base station 102a and the base station 102b, so that the signal processing for 8×4 Broadcast Channel is carried out.

Also, the base-station control station 101a is connected to another base-station control station 101b via a gateway 104, and they have a configuration which avoids their interference by mutually exchanging the information of the belonging base stations to each other and allocating mutually different frequencies to them, and which can carry out the coordinated communication also between the base-station control stations in some cases. By the increase in the number of the transmitting antennas caused by the base-station coordinated control, the throughput of the entire system can be improved. In this example, it is required to provide the function of modem signal processing, which is carried out in the base station 102a, also to the base-station control station 101a.

Figure 2:
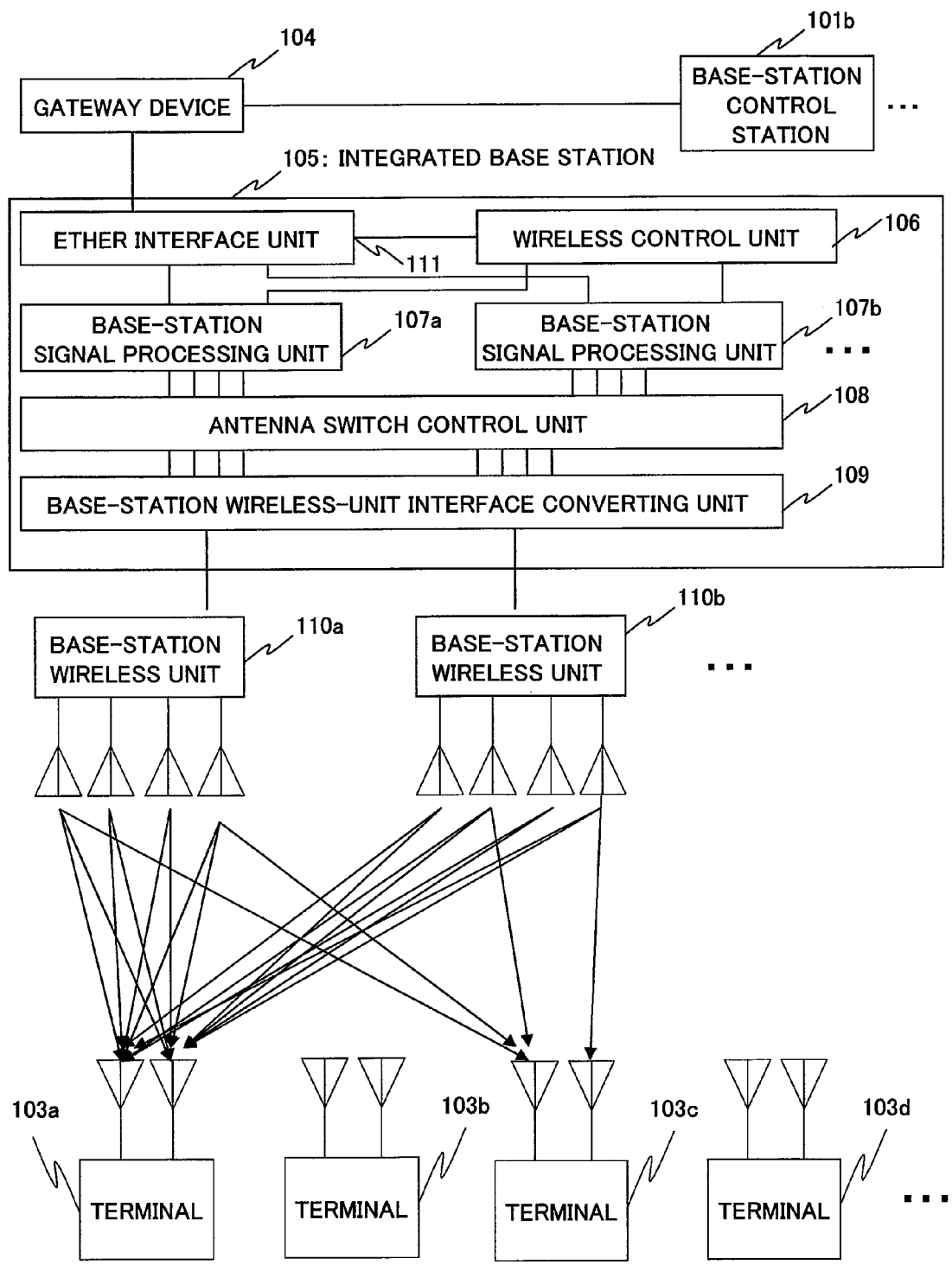
FIG. 2 is an explanatory diagram of a wireless system entire configuration according to another embodiment of the present invention.

With reference to FIG. 2, a method of achieving the inter-base-station coordinated communication according to another embodiment is explained. An integrated base station 105 by which the function of the base-station control station 101a of the example of FIG. 1 is replaced, and base-station wireless units 110a and 110b (RFU: Radio Frequency Units) each having an analog radio function among the functions of the base station 102a are used.

The integrated base station 105 includes: a control unit 106; one or more base-station signal processing units 107a and 107b (BBU: Base Band Units); an antenna switching control unit 108; a base-station wireless-unit interface converting unit 109; and an Ether interface unit 111. The base-station signal processing unit 107a can change a signal processing amount to be scalable in accordance with the number of handled antennas such as the MIMO signal processing for four transmitting antennas and four receiving antennas and the MIMO signal processing for up to eight transmitting antennas and eight receiving antennas. Also, a method of connecting between the base-station signal processing units 107a and 107b and the respective antennas of the base-station wireless units 110a and 110b can be changed by the antenna switching control unit 108. Therefore, in a case of a terminal at an area border which is covered by the base-station wireless units, the antenna which most effectively acts to the terminal is selected, and the signal processing is collectively carried out by the base-station signal processing unit, so that an architecture having an excellent cost performance of the communication-speed performance with respect to a cost of the signal-processing amount is formed. The base-station wireless-unit interface converting unit has a function of conversion into a communication standard format for connecting between the base-station wireless units 110a and 110b and the integrated base station 105. For example, it has an interface converting function which is compatible with CPRI (Common Public Radio Interface) connection by optical connection or others.

FIG. 3 shows an explanatory diagram of the inter-base-station interference avoiding communication. When the base station 102a and the terminal 103a carry out the communication by electric waves 310 which are the desired waves (S), if electric waves 320 of a data signal transmitted from the base station 102b to the terminal 103c reach the terminal 103a from the base station 102b, the electric waves 330 are regarded as interference waves (dotted arrow 330) for the terminal 103a. When it is assumed that the received electric power of the desired wave from the base station 102a is "S", that the electric power of the interference wave is "I", and that the electric power of thermal noise of the terminal is "N", a ratio SINR of the total electric power of I and N with respect to S determines the communication speed of the terminal 103a. If the terminal is sufficiently close to the base station 102a, S is sufficiently larger than I and N, and therefore, the SINR is large, so that a high communication speed is achieved. However, if the terminal 103a is at a cell border between a cell 350a of the base station 102a and a cell 350b of the base station 103b, the ratios of the electric power of the desired wave S and the interference wave I are almost the same, and therefore, the SINR is small, so that a problem of the deterioration of the communication speed arises.

Therefore, as the approach from the conventional techniques in order to avoid the interference signal, some methods are known, such as a method by time division so as not outputting the electric waves from the base station 102b during the time period in which the base station 102a carries out the communication, a communication method by frequency division so as not to overlap frequencies by shifting their center frequencies even when the base station 102a and the base station 102b transmit signals at the same time (the frequencies are shifted by a cell design), and besides, a method by spatial division by determining an antenna directionality pattern in the base station 102a and the base station 102b so as not cause the reach of the electric waves transmitted from the base station 102b as the interference wave at the location of the terminal 103a while the desired wave from the base station 102a sufficiently reaches. These methods are basically for a system which is designed for avoiding the interference signal.

Compared to these methods, a method of the inter-base-station coordinated communication has been appeared, the method improving the utilization efficiency of the frequency resources potentially provided by the system by actively using a region where the signals transmitted from the base stations at the same time sufficiently collide with each other to carry out the inter-base-station coordinated communication.

With reference to FIG. 4, the method of inter-base-station coordinated communication is explained. This method is largely different from FIG. 3 in a point that, while electric waves 450 to be transmitted from the base-station wireless unit 110b to the terminal 103c are conventionally regarded as the interference waves I when the electric waves reach the terminal 103a, the electric waves are not the interference waves I but are converted into the desired waves S also for the terminal 103a by introduction of the integrated base station 105. When the plurality of base-station wireless units 110a and 110b coordinate with each other to communicate with only one terminal 103a at a certain point of time, it is only required to carry out the single-user MIMO processing for the base-station signal processing unit 107a of the integrated base station 105, and this communication is referred to as an inter-base-station coordinated single-user MIMO (COMP-SU-MIMO: Coordinated Multi Point Single User MIMO) communication 470.

When the plurality of base-station wireless units 110a and 110b coordinate with each other to achieve the communication for two or more terminals at the same time, the base-station signal processing unit of the integrated base station 105 carries out a multi-user MIMO signal processing. At this time, the communication is referred to as an inter-base-station coordinated multi-user MIMO (COMP-MU-MIMO: Coordinated Multi Point Multi User MIMO) communication 490.

Figure 5:
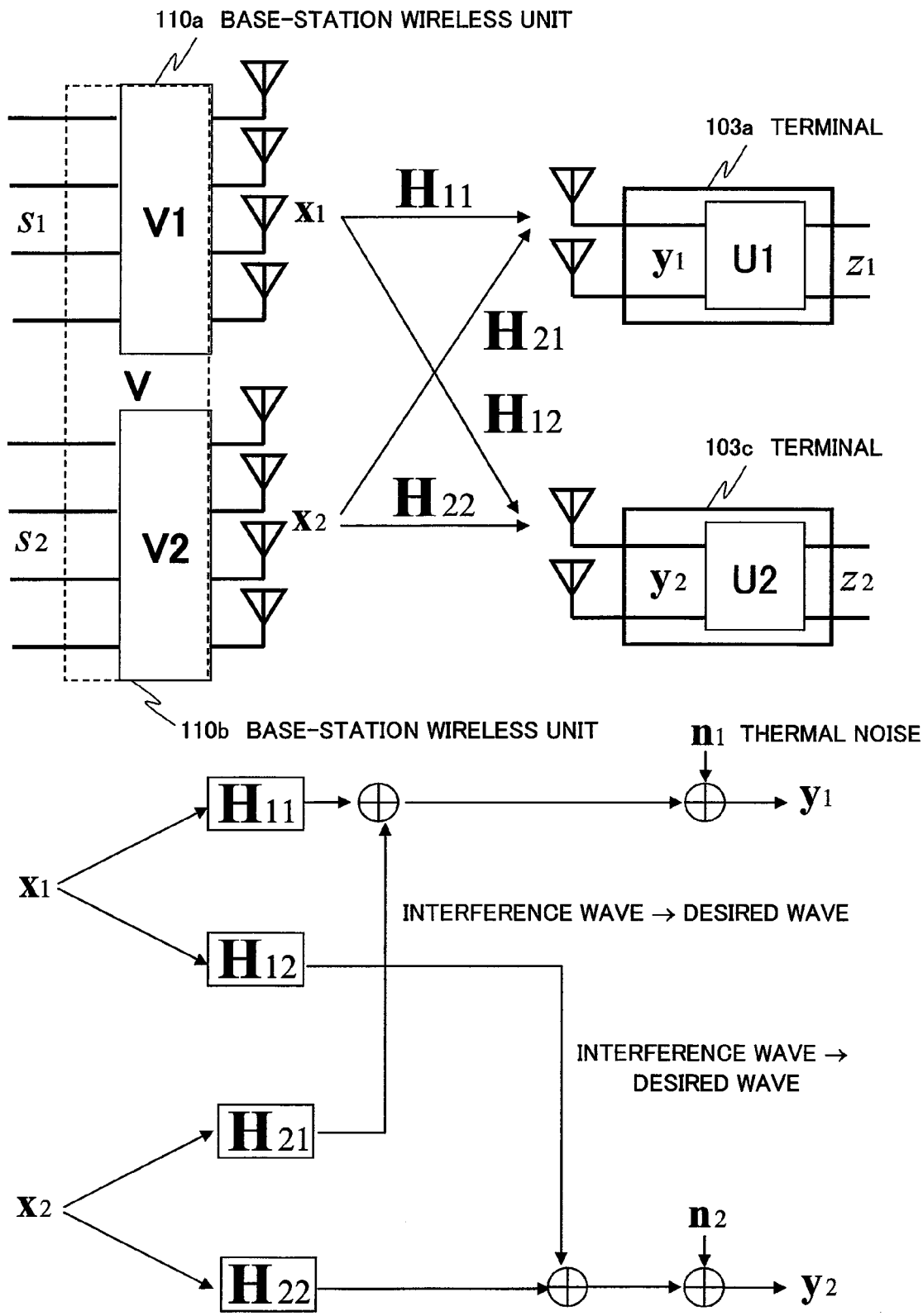
FIG. 5 is an explanatory diagram of a system channel model.

With reference to FIG. 5, a system channel model of the above-described single-user MIMO signal processing and the multi-user MIMO signal processing is explained.

A signal vector transmitted from the plurality of transmitting antennas of the base-station wireless unit 110a is assumed to be "x1", and a signal vector from the base-station wireless unit 110b is assumed to be "x2". Each element of an electric-wave propagation channel matrix (4×2) obtained between the four transmitting antennas and the two receiving antennas in the base-station wireless unit 110a/110b and the terminal 103a/103c is defined as "H11", "H12", "H21", and "H22". A received-signal vector at the receiving antennas of the terminal 103a is assumed to be "y1", and a received-signal vector of the terminal 103c is assumed to be "y2".

First, an attention is focused on a relation between x1 and y1. When the base-station wireless unit 110a communicates with the terminal 103a, if there is no interference signal from a surrounding area by the interference avoiding communication, a state which is equivalent to a case that all of components of H21 are 0 is provided.

The state can be expressed as follows.

$$y_1 = H_{11} x_1 + n_1 \qquad \text{(Equation 1)}$$

Here, a symbol "n1" represents the thermal noise added to the received signal.

As an example that the single-user MIMO processing is carried out for the terminal 103a at the same time as when the time division, the frequency division, or the spatial division can be carried out, the eigenmode propagation method is explained. First, the channel H11 is subjected to the eigenvalue decomposition.

$$H_{11} = U_{11} \Sigma_{11} V_{11}^H \qquad \text{(Equation 2)}$$

Here, each of "U11" and "V11" is a Hermitian matrix, and Σ is a diagonal matrix having an eigenvalue as a diagonal component.

When a transmitting signal is assumed as "s1" and a result of eigenvalue decomposition of a transmitting beamforming matrix "V1" is assumed as "V11", the following equation is obtained.

$$x_1 = V_{11} s_1 \qquad \text{(Equation 3)}$$

From the equations 1, 2, and 3, an equation is expressed as follows.

$$y_1 = H_{11} x_1 + n_1 = U_{11} \Sigma_{11} V_{11}^H V_{11} s_1 + n_1 = U_{11} \Sigma_{11} s_1 + n_1 \qquad \text{(Equation 4)}$$

Next, a received beamforming matrix "U1" for the received signal y1 is expressed by a complex conjugate transposed matrix "U11^H" of U11 in the equation 2 as follows.

$$z_1 = U_1 y_1 = U_{11}^H (U_{11} \Sigma_{11} s_{11} + n_1) = \Sigma_{11} s_1 + U_{11}^H n_1 \qquad \text{(Equation 5)}$$

Since U11^H is a unitary matrix, the electric power of the thermal noise n1 is not amplified. Therefore, the square of the diagonal component is the electric power "S" of the desired signal, and the communication speed is determined by an SN ratio of S with respect to the electric power "N" of the noise. Alternatively to this, the single-user MIMO processing may be achieved by carrying out a method of zero-forcing which uses an inverse matrix of the channel matrix H11 as U1, or a method of carrying out MMSE (Minimum Mean Square Error), which minimizes the least square sum of the received electric power and the interference electric power, on the receiving side and not carrying out any processing on the transmitting side.

Next, regarding the multi-user MIMO communication processing in the interference avoiding communication, the Zero Forcing THP (Tomlinson Harashima Precoder) method is explained. A case that the signal transmitted by the base-station wireless unit 110a is received by the terminal 103a and the terminal 103c at the same time is explained. This case is in a state that the base-station wireless unit 110b does not transmit any signal, and this state is equivalent to a state that the elements of H21 and H22 are 0. At this time, a state of the terminal 103a is expressed by the equation 1, and the received-signal vector y2 of the terminal 103c can be expressed by the following equation 6.

$$y_2 = H_{12} x_1 + n_2 \qquad \text{(Equation 6)}$$

At this time, "H" obtained by synthesizing "H11" and "H12" is subjected to LQ decomposition as expressed by an equation 7.

$$H = \begin{pmatrix} H_{11} \\ H_{12} \end{pmatrix} = LQ \qquad \text{(Equation 7)}$$

By applying a complex conjugate transposed matrix $Q^H$ of Q as a transmitting beamforming matrix, the following equation is obtained.

$$\begin{pmatrix} y_1 \\ y_2 \end{pmatrix} = \begin{pmatrix} H_{11} \\ H_{12} \end{pmatrix} x_1 + \begin{pmatrix} n_1 \\ n_2 \end{pmatrix} = \qquad \text{(Equation 8)}$$

$$Hx_1 + \begin{pmatrix} n_1 \\ n_2 \end{pmatrix} = LQQ^H s_1 + \begin{pmatrix} n_1 \\ n_2 \end{pmatrix} = Ls_1 + \begin{pmatrix} n_1 \\ n_2 \end{pmatrix}$$

Here, a symbol "L" is a lower triangular matrix.

$$Ls1 = \begin{pmatrix} l_{11} & 0 & 0 & 0 \\ l_{21} & l_{22} & 0 & 0 \\ l_{31} & l_{32} & l_{33} & 0 \\ l_{41} & l_{42} & l_{43} & l_{44} \end{pmatrix} \begin{pmatrix} s_{11} \\ s_{21} \\ s_{31} \\ s_{41} \end{pmatrix} \qquad \text{(Equation 9)}$$

A signal "S11" does not have an interference wave, and is transmitted as a desired wave "111×s11". A signal "S21" has a desired wave "122×s21" and an interference wave "121× s11". However, the interference wave is an already-known signal on the transmitting side, and therefore, the signal can be transmitted with removing the interference by carrying out a processing of subtracting this interference wave before the transmission. Such a previous equalization signal processing is known as Zero Forcing THP (Tomlinson Harashima Precoder). This is a method of applying the THP method for reducing intersymbol interference to remove the interference in a spatial direction. Also, in order to prevent increase in the power from the signal processing, a feedback loop with removing the interference and a Modulo operation for power adjustment are utilized. A similar Modulo operation is also required for the receiving side. In this manner, by using the Zero Forcing THP method, the multi-user MIMO signal processing can be achieved. Further, "H12" is subjected to eigenvalue decomposition as expressed by the following equation 10, and is combined with the equation 2, so that a received beamforming matrix is obtained.

$$H_{12} = U_{12} \Sigma_{12} V_{12}^H \qquad \text{(Equation 10)}$$

The obtained received beamforming matrix up to here is regarded as the propagation path, the following equation is obtained.

$$H = \begin{pmatrix} U_{11}^H H_{11} \\ U_{12}^H H_{12} \end{pmatrix} = LQ \qquad \text{(Equation 11)}$$

As expressed above, this new propagation path may be subjected to LQ decomposition to carry out the multi-user MIMO signal processing with using the Zero Forcing THP method.

Next, the single-user MIMO signal processing in the inter-base-station coordinated communication carried out by transmitting the electric wave from the base-station wireless unit 110a and the base-station wireless unit 110b at the same time is explained. The received vector y1 at the terminal 103a can be expressed by the following equation 12.

$$y_1 = H_{11}x_1 + H_{21}x_2 + n_1 = \begin{pmatrix} H_{11} \\ H_{12} \end{pmatrix}\begin{pmatrix} x_1 \\ x_2 \end{pmatrix} + n_1 = Hx + n_1 \qquad \text{(Equation 12)}$$

A propagation channel H obtained by synthesizing H11 and H21 is subjected to eigenmode decomposition.

$$H = U\Sigma V^H \qquad \text{(Equation 13)}$$

By calculating a symbol "V" of the equation 13 at the integrated base station 105 as a transmitting-side beamforming matrix "V" and using a complex conjugate transposed matrix "$U^H$" of a symbol "U" of the equation 13 as a receiving-side beamforming matrix "U1", the single-user MIMO signal processing in the eigenmode propagation can be achieved. Even without carrying out any processing on the transmitting side, the single-user MIMO processing can be also achieved by carrying out the Zero Forcing which uses an inverse matrix of the channel H obtained by synthesizing H11 and H21 on the receiving side for the received beamforming, or by carrying out the MMSE signal processing for the synthesized channel H even on the receiving side.

Next, the multi-user MIMO signal processing in the inter-base-station coordinated communication is explained. This is a case that the base-station wireless units 110a and 110b transmit the signals at the same time to carry out the simultaneous transmission for the terminals 103a and 103c. At this time, an equation 14 is established.

$$\begin{pmatrix} y_1 \\ y_2 \end{pmatrix} = \begin{pmatrix} H_{11} & H_{21} \\ H_{12} & H_{22} \end{pmatrix}\begin{pmatrix} x_1 \\ x_2 \end{pmatrix} + \begin{pmatrix} n_1 \\ n_2 \end{pmatrix} = Hx + \begin{pmatrix} n_1 \\ n_2 \end{pmatrix} \qquad \text{(Equation 14)}$$

Here, as compared with the equation 8, this equation is different in only points that H11 increases to H11 and H21 and that H12 increases to H12 and H22. The multi-user MIMO signal processing in the inter-base-station coordinated communication can be carried out by applying the Zero Forcing THP method such that the H is subjected to LQ decomposition, the transmitting-side beamforming matrix is multiplied by the complex conjugate transposed matrix $Q^H$ of Q, and the interference components are previously cancelled in the components of the lower triangular matrix L for equalization.

Figure 6:
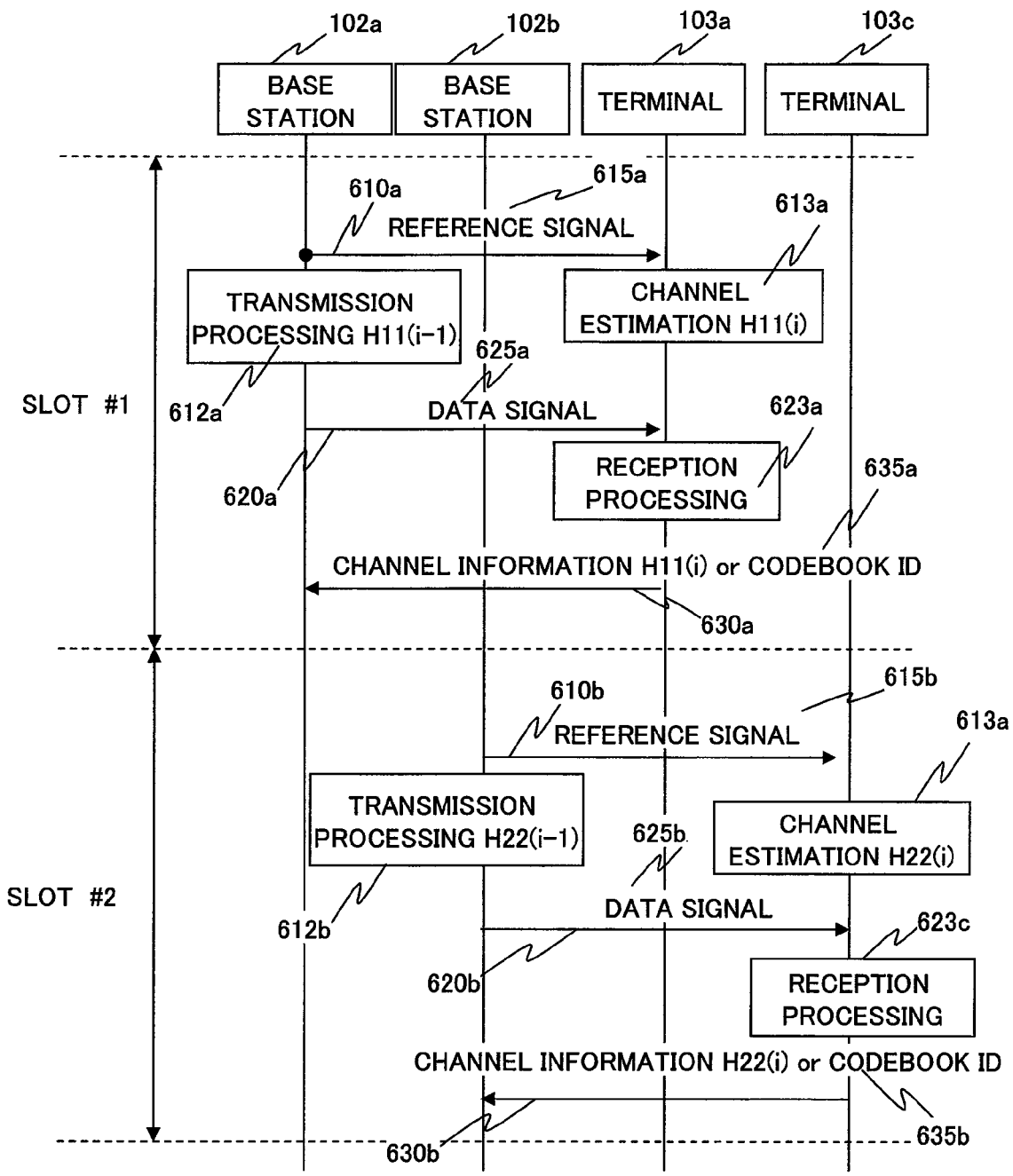
FIG. 6 is an explanatory diagram of a control sequence in an inter-base-station time division multiplex communication.

FIG. 6 shows a control sequence in the inter-base-station time division communication. A reference signal 615a with an already-known pattern is transmitted from the base station 102a or the base-station wireless unit 110a to the terminal (610a). After receiving the reference signal, the terminal 103a carries out the matching with the already-known pattern, and carries out an estimation processing for the channel matrix between the transmitting antenna and the receiving antenna (613a). In this case, the terminal 103a does not receive the reference signal transmitted from the base station 102b or the base-station wireless unit 110b, and therefore, only "H11(j)" is measured as the channel matrix explained in FIG. 5.

Subsequently to the reference signal, a data signal 625a is transmitted from the base station 102a or the base-station wireless unit 110a (620a). At this time, it is assumed that the signal transmitted from the base station 102a or the base-station wireless unit 110a is subjected to the transmission processing 612a of either the above-described single-user MIMO or multi-user MIMO. This transmission processing is carried out based on a channel matrix (in this case, "H11(j−1)") which has been obtained by the channel estimation by the terminal 103a in past. The terminal 103a receives the data signal in a state that the terminal recognizes that either the single-user MIMO processing or the multi-user MIMO processing has been previously carried out, from a protocol processing or others, and then, the terminal carries out the reception processing such as the receiving-side beamforming (623a).

Also, the channel information obtained by carrying out the channel estimation for the reference signal or a codebook ID (635a) indicating index information of a channel-information database in the transmission/reception is fed back from the terminal 103a to the base station 102a or the base-station wireless unit 110a for notification (630a). When they are notified of the codebook ID, in the case of, for example, the above-described single-user MIMO processing, the most desirable matrix is obtained as the V which is the transmitting-side beamforming matrix, and they are notified of the index information of the matrix.

In this control sequence, the example that the data signal is subjected to the transmission processing based on the past channel information has been explained. However, after the feedback of the channel information, the transmitting side may carry out the transmission processing with using the latest channel information, and then, the data signal may be transmitted.

In a next slot #2, the similar processing (610b, 612b, and 625b) as described above are carried out for the tributary terminal 103c of the base station 102b or the base-station wireless unit 110b. Similarly to the terminal 103a, the terminal 103c receives a reference signal 615b and carries out the channel estimation processing (613c). Also, the terminal 103c receives a data signal 625b from the base station 102b (620b) and carries out the reception processing (623b). At this time, the reference signal 615b which is received by the terminal 103c is transmitted by only the base station 102b or the base-station wireless unit 110b, and therefore, the result of the channel estimation is "H22" as explained in FIG. 5.

In the terminal 103c, the channel information obtained by carrying out the channel estimation for the reference signal 615b or a codebook ID (635b) indicating index information of a channel-information database in the transmission/reception is fed back from the terminal 103c to the base station 102b or the base-station wireless unit 110b for notification (630b).

Figure 19:
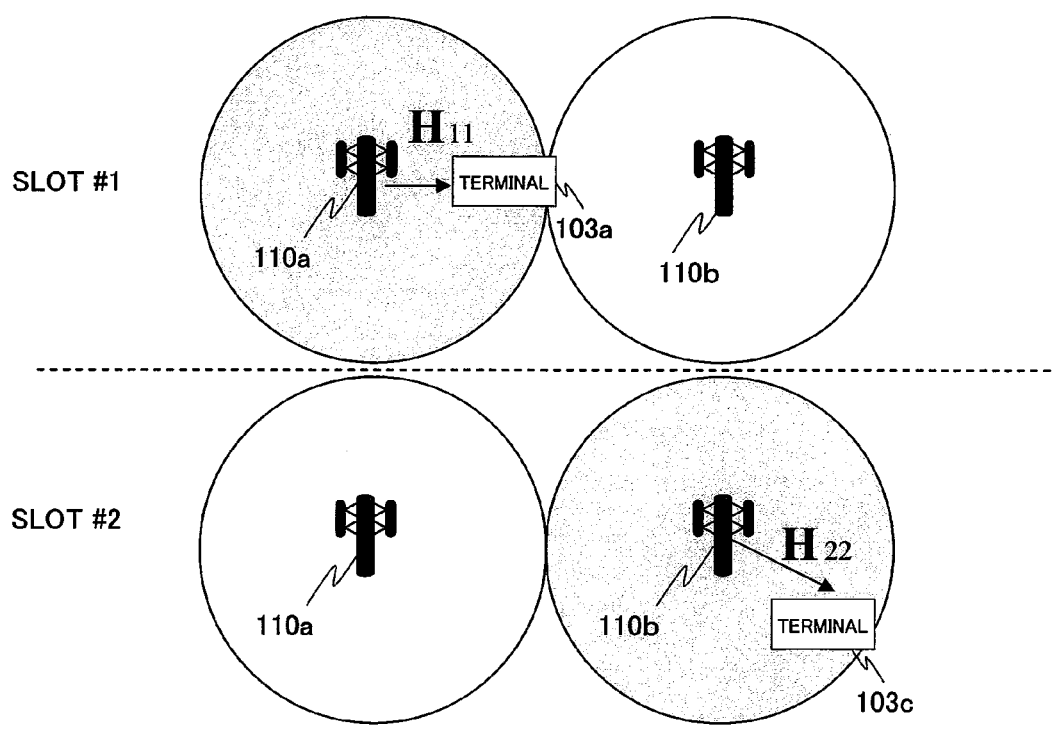
FIG. 19 is a diagram showing a state of electric waves in each slot in the inter-base-station time division communication.

FIG. 19 is a diagram showing a state of electric waves in each slot in the inter-base-station time division communication of FIG. 6. In the slot #1, the communication is carried out from the base station 110a to the terminal 103a in the channel H11. In the slot #2, the communication is carried out from the base station 110b to the terminal 103c in the channel H22.

Figure 7:
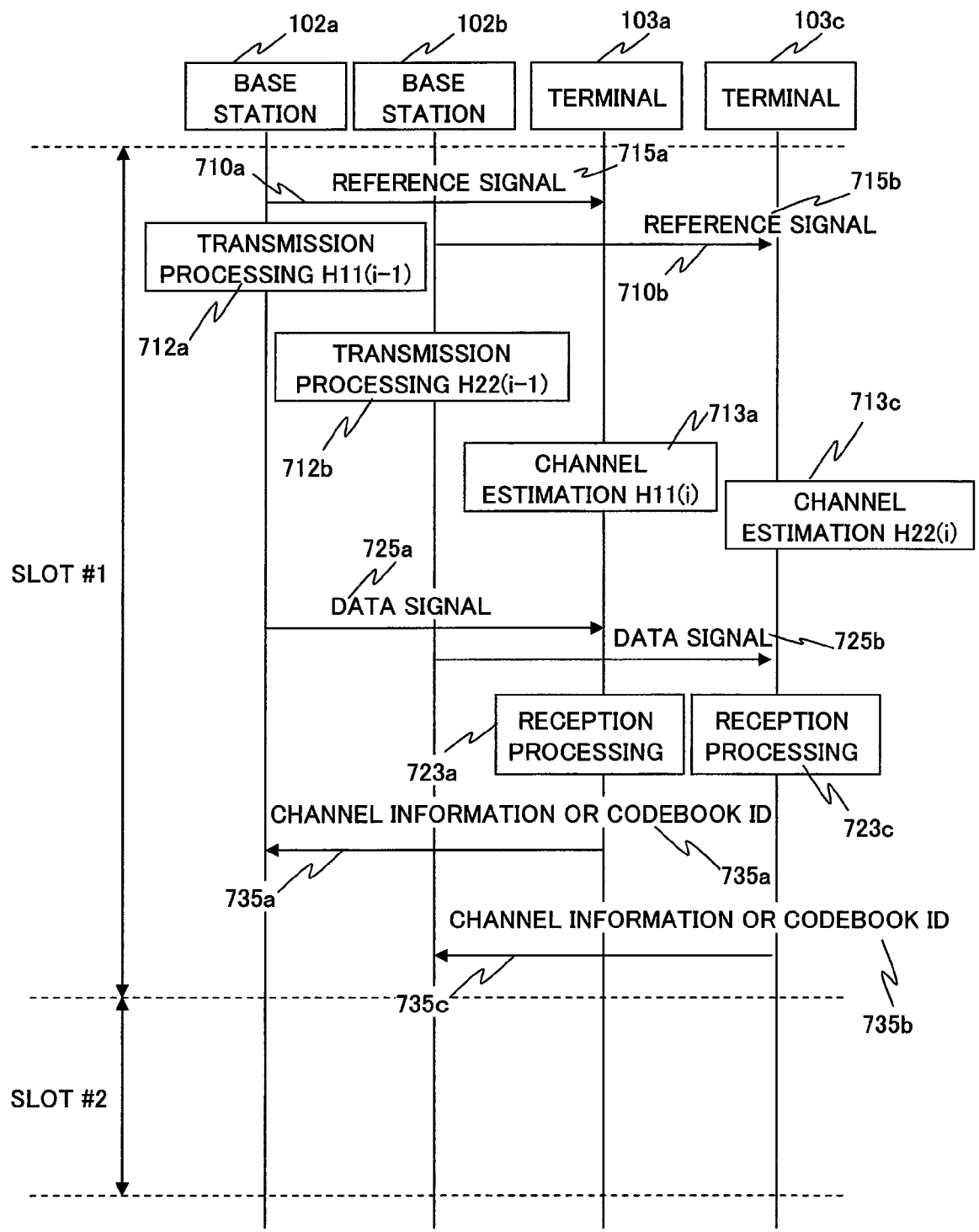
FIG. 7 is an explanatory diagram of a control sequence in an inter-base-station spatial division multiplex communication.

FIG. 7 shows a control sequence in the inter-base-station spatial division multiplex (frequency division multiplex) communication. A reference signal with an already-known pattern is transmitted at the same time from the base station 102a or the base-station wireless unit 110a and the base station 102b or the base-station wireless unit 110b. After receiving the reference signal, the terminals 103a and 103c carry out the channel estimation. At this time, as the result of the channel estimation of the terminal 103a, the signal from the base station 102b or the base-station wireless unit 110b is hidden by the spatial division or the frequency division, and therefore, only the H11 is obtained as the result of the channel estimation. Similarly, the result of the channel estimation at the terminal 103c is only the H22.

The base station 102a or the base-station wireless unit 110a and the base station 102b or the base-station wireless unit 110b carry out the single-user MIMO processing or the multi-user MIMO signal processing which is previously determined by the protocol procedure or others to transmit the data signal at the same time. At this time, it is assumed that the information which has been fed back from the terminals in past slots is used as the channel information required on the transmitting side.

The terminals 103a and 103c carry out the reception processing of the single-user MIMO or the multi-user MIMO for the received data signal to restore the data signal. Then, the terminals 103a and 103c feed back the estimated channel information or the codebook ID to the base station 102a or the base-station wireless unit 110a and the base station 102b or the base-station wireless unit 110b. In this control sequence, the example that the data signal is subjected to the transmission processing based on the past channel information has been explained. However, after the feedback of the channel information, the transmitting side may carry out the transmission processing with using the latest channel information, and then, the data signal may be transmitted.

Also in a subsequent slot #2, the similar processing to those of the slot #1 is carried out.

Figure 20:
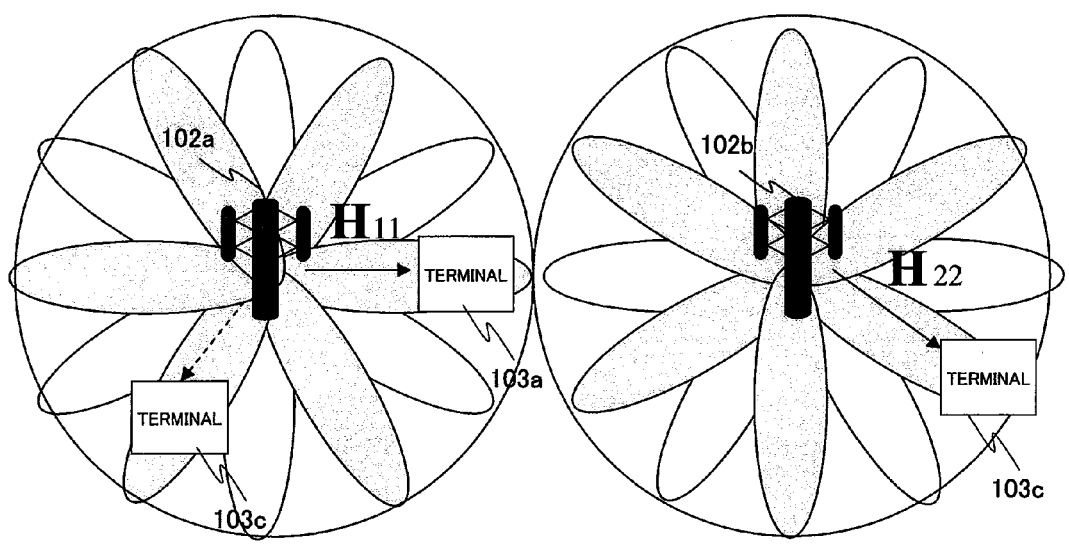
FIG. 20 is a diagram showing a state of electric waves in the inter-base-station spatial division multiplex communication.

FIG. 20 is a schematic diagram the inter-base-station spatial division multiplex communication caused by the result of the sequence of FIG. 7. This shows that the communication is carried out in the channels H11 and H22 from the base-station wireless units 102a and 102b to the terminal 103a and terminal 103c in the same slot, respectively.

Figure 8:
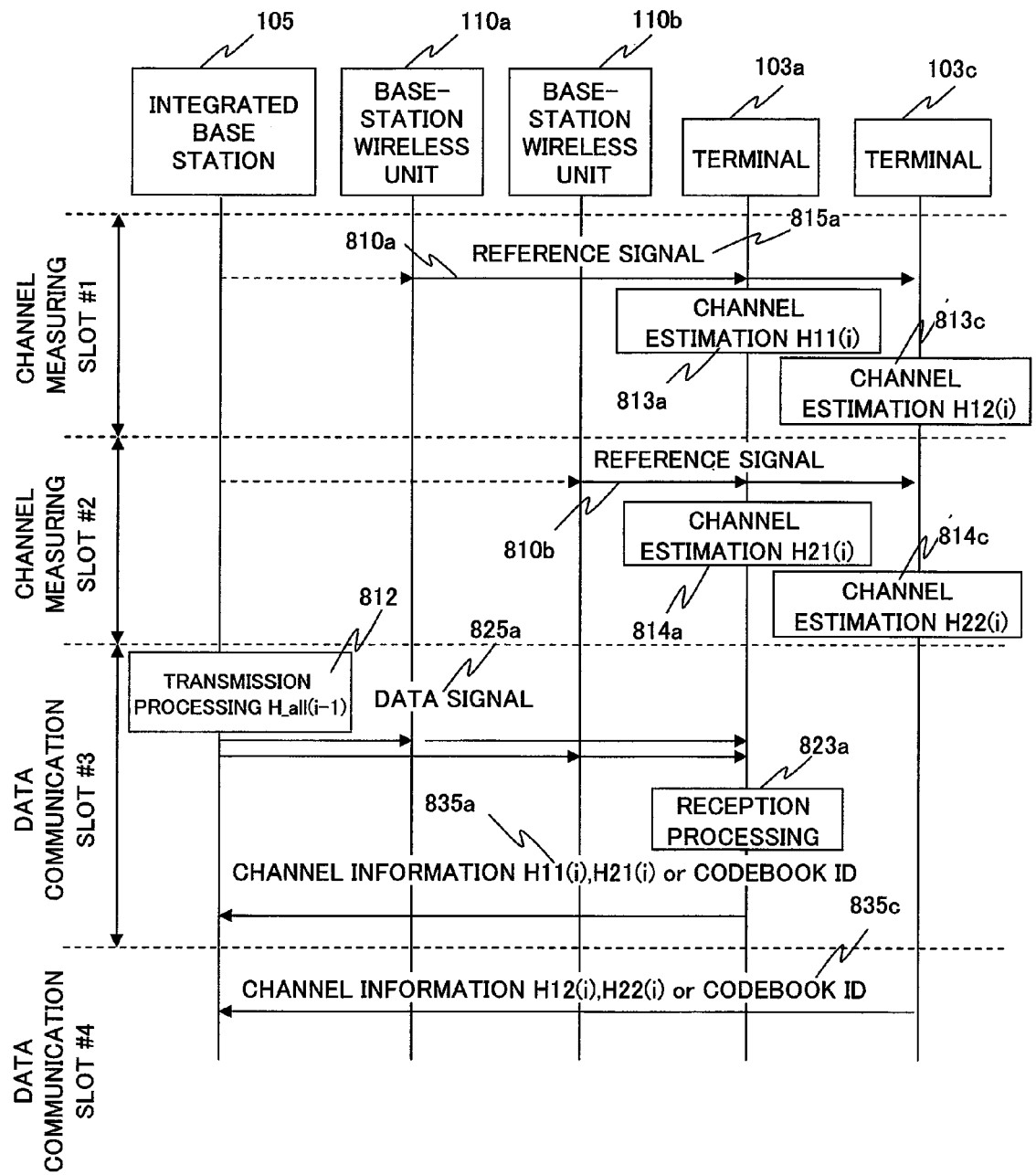
FIG. 8 is an explanatory diagram of a control sequence in an inter-base-station coordinated communication (single-user MIMO)

FIG. 8 shows an explanatory diagram of a control sequence in the inter-base-station coordinated communication. First, in a channel measurement slot #1, a reference signal is transmitted from the base-station wireless unit 110a. In generation of the reference signal, the signal may be generated in the base-station wireless unit 110a, or a signal generated by the integrated base station 105 may be transmitted via the base-station wireless unit 110a. The terminals 103a and 103c, which have received the reference signal, and carry out the channel estimation to obtain the channel matrices H11 and H12, respectively. In a next channel measurement slot #2, a reference signal is transmitted from the base-station wireless unit 110b, and the terminals 103a and 103c obtain the channel matrices H21 and H22, respectively, as the result of the channel estimation. In a subsequent data communication slot #3, the data signals are transmitted by carrying out the transmitting-signal processing in accordance with the single-user MIMO processing or the multi-user MIMO processing which has been previously determined by the protocol processing or others. In the example of FIG. 8, the case of the single-user MIMO processing of only the terminal 103a is described as an example in the data slot #3. The data signals are generated at the integrated base station 105, and reach the terminal 103a at the same time via both of the base-station wireless unit 110a and the base-station wireless unit 110b.

The terminal 103a executes the reception processing in accordance with the single-user MIMO processing or the multi-user MIMO processing which has been previously determined by the protocol process or others to restore the data signals. After the reception processing of the data signals, the channel information H11 and H21 is fed back to the integrated base station 105. As this feedback, the example carried out after the reception of the data signals in the data communication slot has been explained. However, this feedback may be carried out in the channel measurement slot. Note that, for this feedback, it is also required to individually provide a feedback channel such as division in time since it is required to multiplex the feedback from the plurality of terminals of the terminals 103a and 103c. Also, the information of the H21 has not been obtained yet at the time of the channel measurement slot #1, and therefore, it is required to determine the timing for the feedback by a protocol so that the notification is carried out after the information of all surrounding base stations of the terminal is obtained.

In a subsequent data communication slot #4, a data signal for the terminal 103c is transmitted, the channel information H12 and H22 is fed back, or others.

In this example, the example of the single-user MIMO processing has been explained. However, the terminal 103a and the terminal 103c may be involved in the multi-user MIMO processing at the same time.

Figure 21:
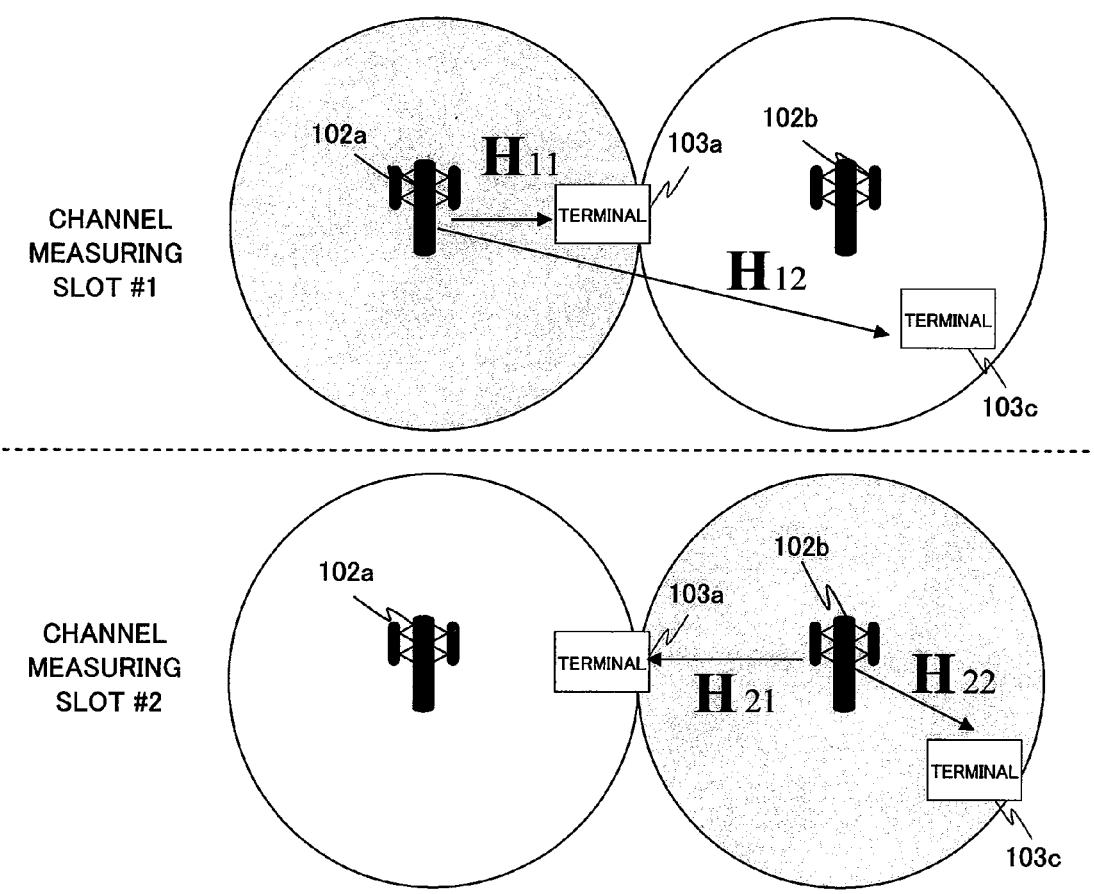
FIG. 21 is a diagram showing a state of electric waves in a control sequence in the inter-base-station coordinated communication.

FIG. 21 is a diagram showing a state of electric waves in a control sequence in the inter-base-station coordinated communication. In the channel measurement slot #1, the base-station wireless unit 102a communicates with the terminal 103a in the channel H11, and communicates with the terminal 103c in the channel H12. On the other hand, in the channel measurement slot #2, the base-station wireless unit 102b communicates with the terminal 103a in the channel H21, and communicates with the terminal 103c in the channel H22.

Figure 9:
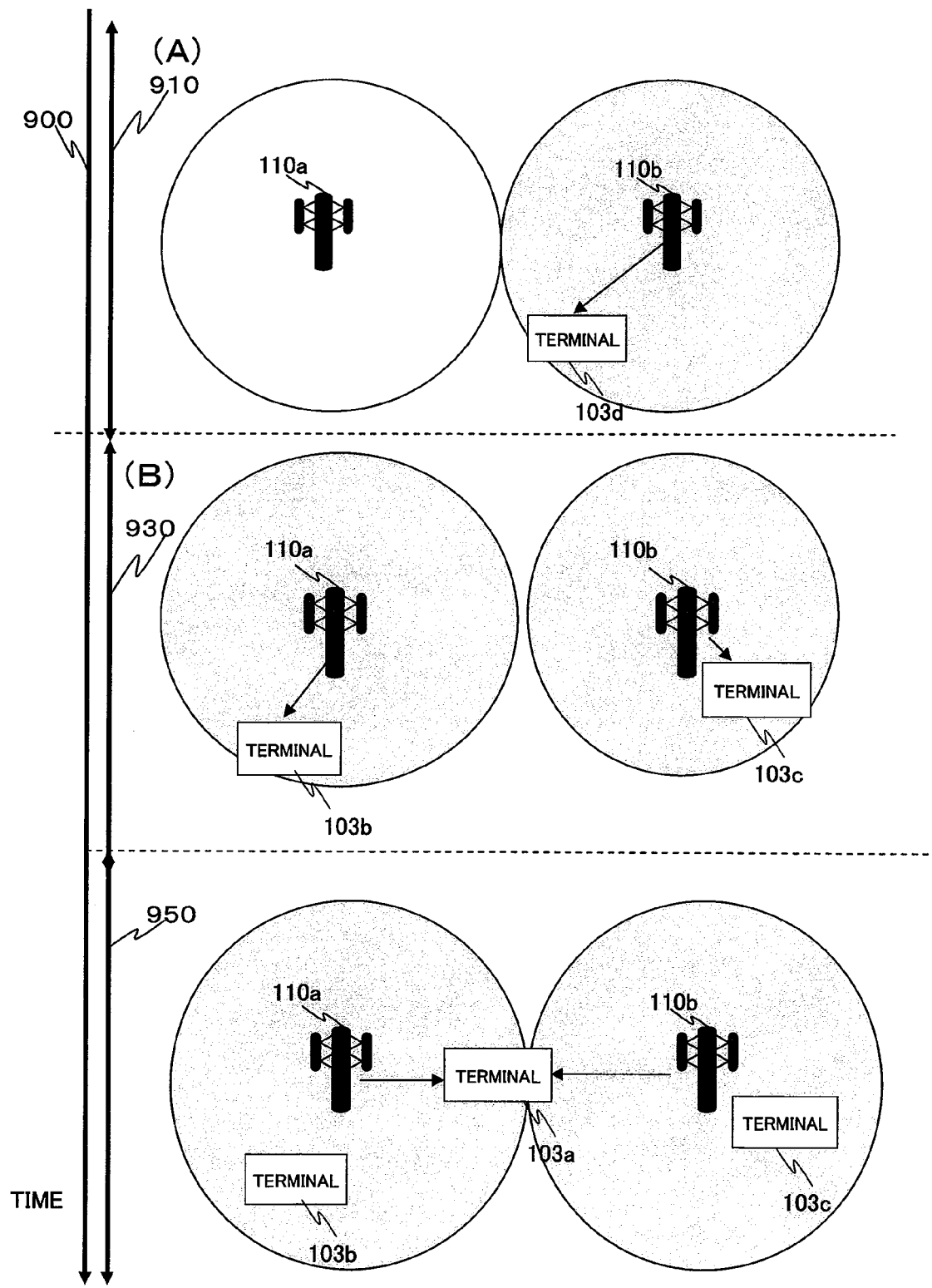
FIG. 9 is an explanatory diagram of a mixed method of the inter-base-station interference avoiding communication and the inter-base-station coordinated communication according to an embodiment of the present invention.

FIG. 9 shows an explanatory diagram of a mixed method of the inter-base-station interference avoiding communication and the inter-base-station coordinated communication according to an embodiment of the present invention. Each of the above-described communication methods of FIGS. 6, 7, and 8 is successfully operated, or conversely, is not successfully operated depending on an electric-wave propagation condition between the terminals and the base stations. Accordingly, as shown in FIG. 9, it is considered that these methods are mixed with each other and the communication methods are switched in a frame structure in which a time period for each communication method is mutually separated.

Along a time axis 900, a frame is largely divided into three time periods to be operated.

A first time period is allocated as an inter-base-station time-division communication time 910. This time period is time-divided into a plurality of slots, one base-station wireless unit is selected from 110a or 110b in each of the slots, and the data communication is carried out from the selected base-station wireless unit. This diagram shows an example that, when the base-station wireless unit 110b is selected, the base-station wireless unit 110b communicates with a terminal 103d.

In a second time period 930, terminals which can be combined with each other for the spatial division are selected, and signals are transmitted from a plurality of base-station wireless units to the respective terminals at the same time. For example, if the terminal close to the base-station wireless unit is selected, its SINR ratio is high. Therefore, even when the signals are transmitted by the plurality of base-station wireless units at the same time, the request speed of the terminal can be satisfied.

A third time period 950 is a time period in which the inter-base-station coordinated communication is carried out. This is used for saving the terminal at the cell edge. This is a time period for the inter-base-station coordinated communication with using the interference of the electric waves between the base-station wireless unit 110a and the base-station wireless unit 110b.

These time periods may be operated so as to be previously fixedly allocated as a system, or their operating time may be dynamically variable in accordance with a ratio of the number of terminals operated in each time period. For example, when the number of the terminals requiring the inter-base-station coordinated communication is 0 and when the number of the terminals which can be combined for the spatial division is 0, only the inter-base-station time division communication may be employed. Conversely, when all of the terminals require only the inter-base-station coordinated communication, the frame may be occupied as the time period for only the inter-base-station coordinated communication. The frame is divided into N slots, and the frame is dynamically operated by proportional distribution of the N slots in accordance with the numbers of the terminals belonging to the above-described three time periods. Note that the time periods 930 and 950 are the time periods for the inter-base-station simultaneous communication. Also, the time periods 910 and 930 are the time periods for the inter-base-station interference avoiding communication.

Figure 10:
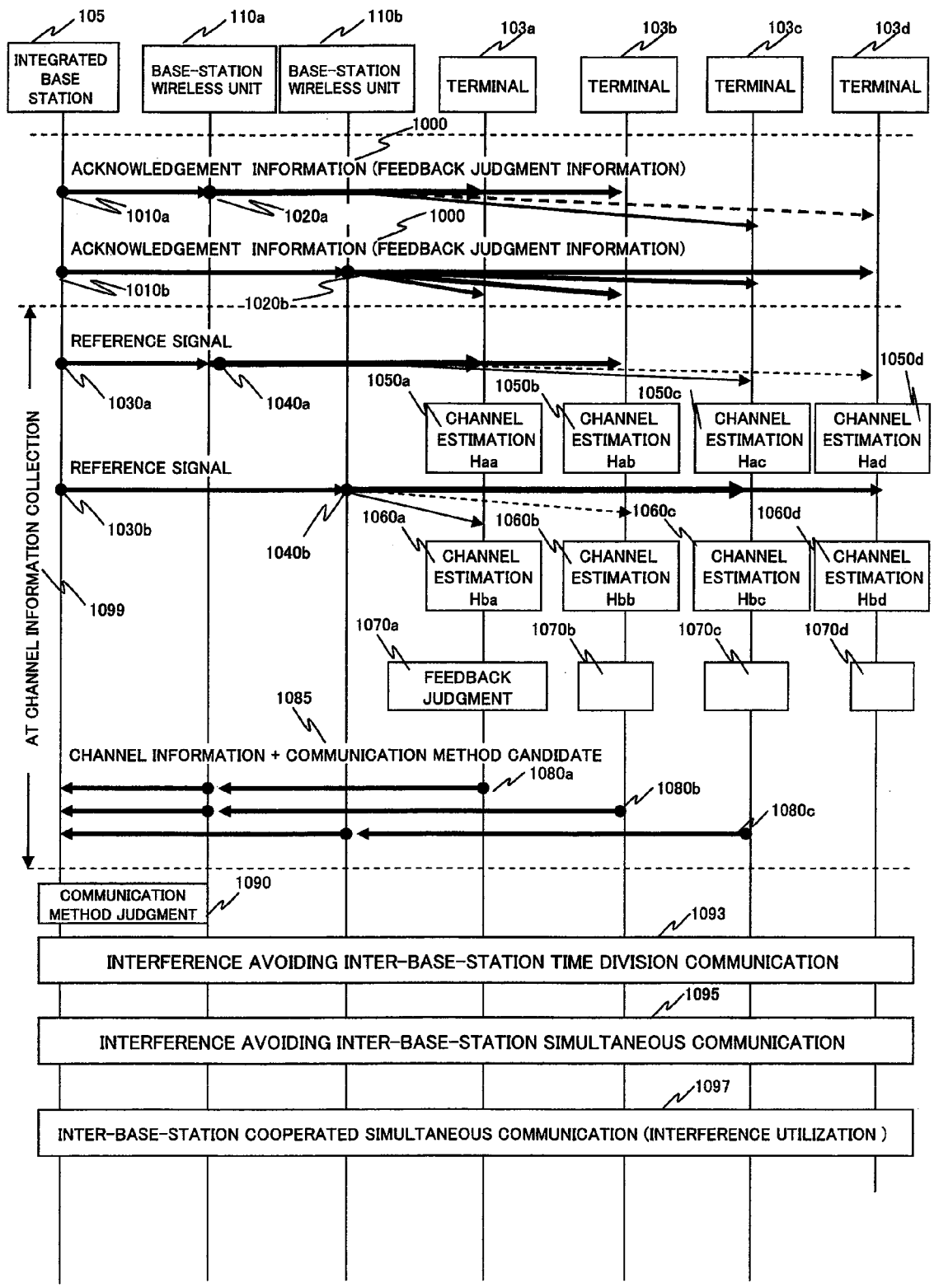
FIG. 10 is an explanatory diagram of a control sequence of channel-information collection according to the embodiment of the present invention.

FIG. 10 shows an explanatory diagram of a control sequence of a channel information collecting phase according to the embodiment of the present invention. In the above-described examples of FIGS. 6 to 8, the assumption that the channel information obtained by the channel estimation by the terminals is always fed back has been explained. However, if the number of the terminals handled by one base station or base-station wireless unit is increased, the feedback amount is increased, and therefore, the act of the feedback increases protocol overhead, this becomes a throughput deteriorating factor. Accordingly, the present example employs a configuration in which the feedback judgment information is broadcasted together with the acknowledgment information so that the terminal side can judge whether the feedback is to be carried out or not. The integrated base station 105 periodically transmits the feedback judgment information as an element of the acknowledgment information via the base-station wireless units 110a and 110b (1010a, 1010b, 1020a, and 1020b). The terminal 103 acquires the feedback judgment information from a control channel containing the acknowledgment information, and decodes the information.

Next, the integrated base station 105 sequentially transmits reference signals having already-known patterns via the base-station wireless units 110a and 110b (1030a, 1030b, 1040a, and 1040b). The reference signals themselves may be generated in the integrated base station 105 or may be generated in the base-station wireless units 110a and 110b. These reference signals are received by the terminals 103a, 103b, 103c, and 103d, and store the channel information in accordance with channel estimation (1050a, 1050b, 1050c, 1050d, 1060a, 1060b, 1060c, and 1060d). In each of the terminals 103a, 103b, 103c, and 103d, it is judged whether the channel information is to be fed back or not by utilizing the obtained channel information and the previous feedback judgment information (1070a, 1070b, 1070c, and 1070d). The terminal from which the feedback is to be carried out notifies the integrated base station 105 of the channel information and candidates of the communication methods which are preferred for the terminal as the feedback channel. In the example of FIG. 10, each of the terminals 103a, 103b, and 103c notifies the integrated station 105 of the channel information and a communication-method candidate 1085 via the base-station wireless units 110a, 110b, and 110c (1080a, 1080b, and 1080c). The terminal 103d of FIG. 10 has judged by the feedback judgment that the feedback is not required to be carried out (1070d), and therefore, the terminal does not notify the super base station as shown by 1080a, 1080b, and 1080c. The time taken from when the integrated base station 105 transmits the reference signals until it receives the feedback channels corresponds to a channel information collecting period 1099.

Then, the integrated base station 105 determines the communication method for each of the terminals based on the obtained information (1090), and notifies the terminals of any of the interference avoiding inter-base-station time division communication, the interference avoiding inter-base-station simultaneous communication, or the inter-base-station coordinated simultaneous communication, so that each communication is executed (1093, 1095, and 1097).

Figure 11:
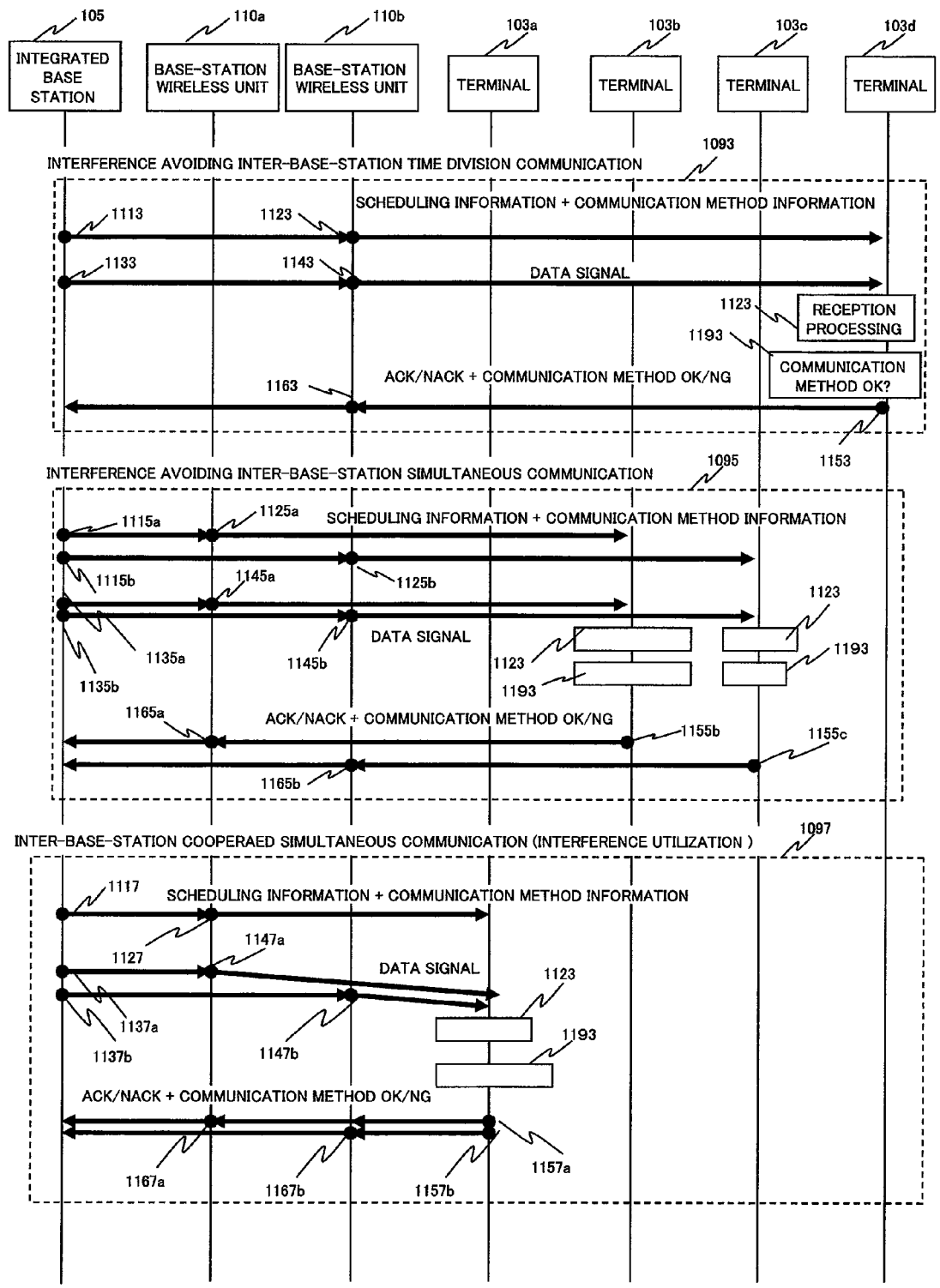
FIG. 11 is an explanatory diagram of a control sequence of the inter-base-station coordinated communication and the interference avoiding communication of the inter-base-station time division multiplex communication.

FIG. 11 shows an explanatory diagram of a control sequence in interference avoiding communication and the inter-base-station coordinated communication according to the embodiment of the present invention. After the processing of obtaining the channel information of each of the terminals and determining the communication method for each of the terminals by the integrated base station 105 (1090) from the control sequence of FIG. 10, the frame is divided into three time periods.

A first time period is for an interference avoiding inter-base-station time division communication 1093. An example of FIG. 11 shows a case that the terminal 103*d* employs the interference avoiding inter-base-station time division communication. The integrated base station 105 notifies the terminal 103*d* of the information of the determined communication method and scheduling information via the base-station wireless unit 110*b* (1113 and 1123), and then, transmits a data signal thereto (1133 and 1143).

The scheduling information, the communication method information, and the data signal may be generated in the integrated base station 105 or may be generated in the base-station wireless unit 110*b* to be closed. In the case that they are generated in the base-station wireless unit 110*b* to be closed, the base-station wireless unit 110*b* also requires a baseband signal processing.

Here, the scheduling information is the same as a standardized content such as Release 8 of 3GPP, and is the information such as a resource block used in MCS (Modulation Coding Scheme) or OFDM.

The communication method information is the information indicating either the interference avoiding communication or the inter-base-station coordinated communication, or either the single-user MIMO processing or the multi-user MIMO processing. Also, when a codebook is used as information of a slot number where the communication is carried out, information of an ID for specifying the used base station and antenna, or information of the received beamforming, the transmitting side also notifies of (feeds forward) a codebook ID, a receiving weight matrix, or others in some cases.

In accordance with the notification information, the data signal is transmitted from the integrated base station 105 via the base-station wireless unit 110*b* (1133 and 1143), and the terminal 103*d* carries out the reception processing of restoring the data signal in accordance with the notified processing (1123). The terminal 103*d* generates an Ack/Nack signal in a reception frame unit by a CRC code which is attached to the data signal, and feeds the signal back to the transmitting side (1153 and 1163). In this feedback, it is judged that the selected communication method is either OK or NG (1143), and the OK/NG information of the communication method is also fed back.

As a criterion for the judgment either the communication method is OK or NG, the method is OK if it is judged that the requested communication speed can be sufficiently supported by the current communication method, and the method is NG if it is judged that the requested speed cannot be satisfied unless the communication method is changed. For example, although the interference avoiding inter-base-station time division communication is selected at the terminal 103*d*, if the requested speed is not satisfied by this communication method, and if there is a possibility that the requested communication speed can be satisfied by the inter-base-station coordinated communication, the feedback notification indicating that the communication method is NG is carried out.

Next, a time period 1095 for the interference avoiding inter-base-station simultaneous communication is explained. The integrated base station 105 notifies the terminals 103*b* and 103*c* of the scheduling information and communication method information via the base-station wireless units 110*a* and 110*b* (1115*a*, 1125*a*, 1115*b*, and 1125*b*), and transmits data signals thereto (1135*a*, 1135*b*, 1145*a*, and 1145*b*). The scheduling information, the data signals, and others may be generated in the base-station wireless unit 110*a* to be closed or may be generated in the integrated base station 105.

Since the terminals 103*b* and 103*c* are in the spatially-divided state, they carry out the reception processing (1123) for the data signal which has been subjected to the single-user MIMO or multi-user MIMO signal processing in the slot number specified by each communication method information for the restoring. Also in each of the terminals 103*b* and 103*c*, it is judged either the communication method is OK or NG as described above (1193), and the OK/NG results of the communication method is fed back together with the Ack/Nack signal for the frame (1155*b*, 1155*c*, 1165*a*, and 1165*b*).

Finally, a time period 1097 for the inter-base-station coordinated simultaneous communication (interference utilization) is explained. The integrated base station 105 notifies the terminal 103*a* of the scheduling information and the communication method information (1117 and 1127). As a path for the notification of these control signals, it is assumed that the terminal 103*a* is a tributary terminal or that it notifies the terminal 103*a* via the base-station wireless unit 110*a* having an antenna with the highest propagation gain. This information may be also transmitted at the same time via both of the base-station wireless units 110*a* and 110*b*.

The data signals are transmitted at the same time by signals (1137*a* and 1147*a*) via the base-station wireless unit 110*a* and signals (1137*b* and 1147*b*) via the base-station wireless unit 110*b*. The terminal 103*a* carries out the reception processing (1123) for the data signals in accordance with the inter-base-station coordinated communication, the single-user MIMO signal processing, or multi-user MIMO signal processing, which are written on the communication method information, and restores the signals. Also, it is similarly judged that the result of the communication method is either OK or NG (1193), and the result is fed back to the integrated base station 105 together with the Ack/Nack signal for the frame (1157*a*, 1157*b*, 1167*a*, and 1167*b*). As an example of the OK/NG judgment of the communication method, the result that the communication method is NG can be outputted if it is judged that the requested speed of the terminal 103*a* seems to be sufficient even in the interference avoiding inter-base-station time division communication.

Figure 12A:
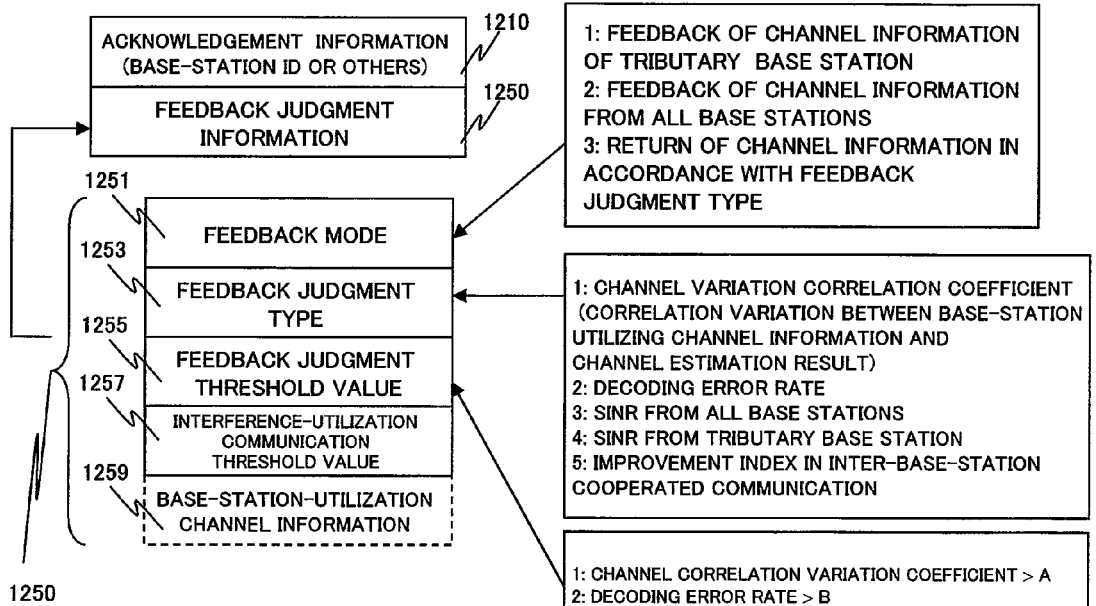
FIG. 12A-FIG. 12C is an explanatory diagram of a control signal format required for carrying out a communication procedure according to the embodiment of the present invention.
Figure 12B:
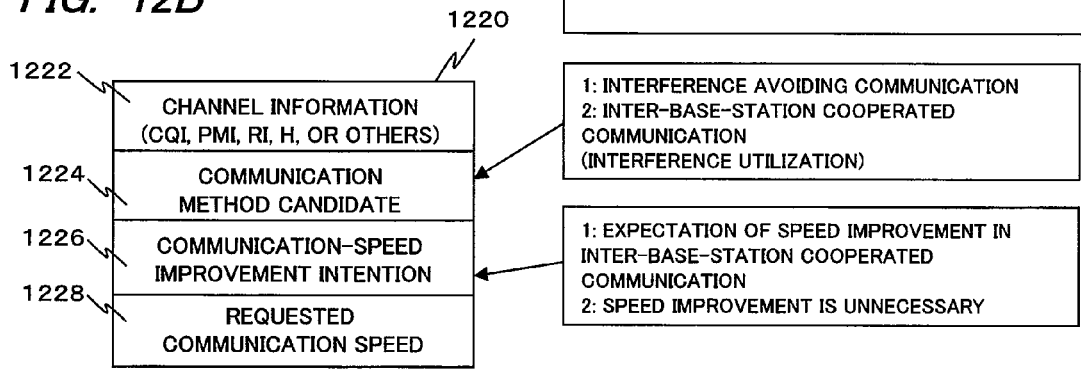
Figure 12C:
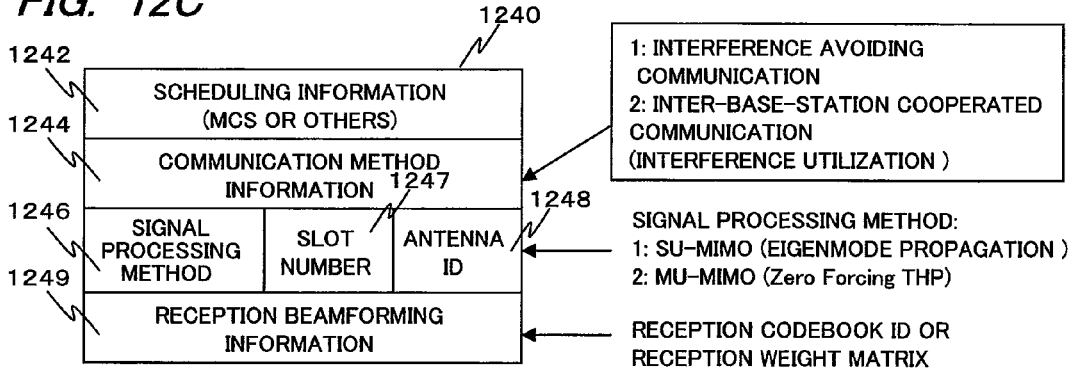

FIG. 12 shows an explanatory diagram of a format of the control signal according to the embodiment of the present invention.

First, (A) shows acknowledgement information 1210 and feedback judgment information 1250 of which the notification is carried out from the base station to the terminal. The acknowledgement information 1210 indicates acknowledgement information specified by specification such as 3GPP standard, and contains a base station ID or others. As an information element added to the acknowledgement information, the feedback judgment information is additionally written thereon. As the information forming element, the feedback judgment information 1250 contains a feedback mode

1251, a feedback judgment type 1253, a feedback judgment threshold value 1255, an interference utilizing communication threshold value 1257, base-station utilizing channel information 1259, and others. A feedback mode corresponding to a number stored in the feedback mode 1251 is specified. If "1" is specified, it is specified that the channel information for the transmitting antenna of the base station to which the terminal is tributary is fed back. If "2" is specified, the channel information from the transmitting antennas of all of the peripheral base stations which can be observed by the terminal is fed back. If "3" is specified, the channel information is returned under a condition that the information measured in accordance with the feedback judgment type satisfies the feedback judgment threshold value.

As the field judgment threshold value 1255, at least one of a threshold value "A" of a channel correlation variation coefficient, a threshold value "B" of a decoding error rate, a threshold value "C" of the SINR from all the base stations, a threshold value "D" of the SINR from the tributary base station, and a threshold value "E" of an improvement index in the inter-base-station coordinated communication is specified.

In the feedback judgment type 1253, if "1" is specified, a correlation value of the base-station utilizing channel information 1259 with respect to the channel estimation result measured at the terminal is calculated. A variation speed of this correlation value per unit time is referred to as a channel variation correlation coefficient. If the channel variation correlation coefficient is larger than the value A indicated in the feedback judgment threshold value 1255, this means that the variation is too fast to be followed by the base-station utilizing channel information, and new channel information is fed back from the terminal to the base station.

In the feedback judgment type 1253, if "2" is specified, an error rate of the decoding result is measured. If the error rate is larger than the value B indicated in the feedback judgment threshold value 1255, the terminal notifies the base station of the channel information since there is a possibility that the terminal is at the cell edge.

In the feedback judgment type 1253, if "3" is specified, the terminal calculates the channel matrices to the terminal receiving antennas from the reference signals which are transmitted from all the base-station antennas. The SINR is measured by ordering the terminals in descending order of the propagation-path gain between the transmitting antenna and the receiving antenna from the calculation result, assuming the received electric power of the paths for the number of the receiving antennas as "S", and assuming the received electric power from the other transmitting antenna as "I". If the SINR is larger than the feedback judgment threshold value C, performance improvement is expected by the inter-base-station coordinated communication, and therefore, the terminal feeds back the channel information.

In the feedback judgment type 1253, if "4" is specified, the SINR is measured with assuming the received electric power of the reference signal which is transmitted from the tributary base-station antenna as S and assuming the received electric power of the reference signal which is transmitted from the other base-station antenna than that of the tributary base-station as I. If the SINR is larger than the feedback judgment threshold value D, the terminal feeds back the channel information to the base station since there is a high possibility that it is the terminal already having the effect of the spatial division multiplex.

In the feedback judgment type 1253, if "5" is specified, the improvement index in the inter-base-station coordinated communication which will be described later is measured. If the improvement index is larger than the value E indicated in the feedback judgment threshold value 1255, it is judged that the effect by the inter-base-station coordinated communication is high, and the channel information is fed back from the terminal to the base station.

Here, an example of the improvement index in the inter-base-station coordinated communication is explained. From the reference signals which are transmitted from the tributary base-station transmitting antenna, the received electric power of the desired wave when the transmitting antenna providing the desired wave is selected is defined as S, and the received electric power of the reference signal which is transmitted from the transmitting antenna not providing the desired wave but to be contributed as the interference from the transmitting antenna of the tributary base station and the received electric power of the reference signal which is transmitted from the other base-station antenna than that of the tributary base station are defined as I. A symbol "N" represents electric power of the thermal noise, and represents the electric power obtained after noise intensification which is after the gaussian noise signal is subjected to the beamforming processing on the receiving side. At this time, a communication capacity expressed by the following equation 15 is an indicator of an actual communication speed.

$$C_1 = \log_2\left(1 + \frac{S}{1+N}\right) \quad \text{(Equation 15)}$$

Meanwhile, if all of the interference electric power I can be utilized as the desired wave by the inter-base-station coordinated communication, improvement of a communication capacity expressed by the following equation 16 is expected as the communication speed.

$$C_2 = \log_2\left(1 + \frac{S+I}{N}\right) \quad \text{(Equation 16)}$$

Therefore, as the improvement index in the inter-base-station coordinated communication, the following equation or others is cited.

$$\frac{C_2}{C_1},\ C_2 - C_1,\ \frac{C_2 - C_1}{C_1} \quad \text{(Equation 17)}$$

Also, without calculating the communication capacity, the following equation can be used as the index.

$$\frac{(S+I)/N}{S/(I+N)} \quad \text{(Equation 18)}$$

The terminal whose index described above is high has a high effect of the speed improvement by the inter-base-station coordination.

As described above, the control is made with feedback judgment type and the feedback judgment threshold value, so that, if the condition of the threshold values is tightly set, the number of the terminals which feed back the channel information is decreased, and, if the condition of the threshold values is loosely set, the number of the terminals which feed back the channel information is increased. Therefore, an information amount of the feedback control signal can be controlled. Also, the information of the terminal which is desired on the base station side can be efficiently collected depending on a role of the feedback judgment type indicating whether the terminal is useful for the inter-base-station coordinated communication or not as the feedback from the terminal or others.

Next, as shown in (B) of FIG. 12, a control signal format 1220 of the channel information and the communication method candidate as the feedback from the terminal to the base station is explained. This control signal contains channel information (CQI, PMI, RI, H, or others) 1222, a communication method candidate 1224, a speed improving intention 1226, and a requested communication speed 1228, as components. The channel information (CQI, PMI, RI, H, or others) indicates the CQI (Channel Quality Indicator) which is an index of channel reception quality standardized by the 3GPP standard or others, the PMI (Preferred precoding Matrix Index) which is an index of a matrix preferred for the transmitting beamforming, and RI (Rank Index) for notifying the number of ranks of the channel matrices. Also, in the standard such as IEEE 802.11n, the channel matrix H itself may be fed back as the control signal.

As the communication method candidate 1224, either of the values indicating the interference avoiding communication or the inter-base-station coordinated communication is specified. The terminal side cannot judge the spatial division multiplexing, and therefore, it is judged between the base stations either the interference avoiding communication or the inter-base-station coordinated communication is desirably carried out, and they notifies the integrated base station 105 of that.

In the communication speed improving intention 1226, a value indicating whether the speed is improved by the inter-base-station coordinated communication or not is specified. This value is a parameter required when the communication method is determined at the integrated base station 105. When the requested communication speed is not satisfied, the value clearly indicates either that the terminal desires the speed improvement by the inter-base-station coordinated communication or that the communication speed improvement is not required because it cannot be handled by the inter-base-station coordinated communication.

Next, as shown in (C) of FIG. 12, the format 1240 of the control signal of the scheduling information 1242 and the communication method information 1244 of which the base station notifies the terminal is explained. The scheduling information 1242 indicates the similar content to that determined by the 3GPP standard such as MCS (Modulation and Coding Scheme) which is a table of a modulation method and encoding and as information of a resource block indicating which sub carrier of OFDM is to be used. In the communication method information 1244, if "1" is specified, the interference avoiding communication is carried out, and, if "2" is specified, the inter-base-station coordinated communication (interference utilization) is carried out. In the subsequent signal processing method 1246, it is specified that the signal processing method carried out on the transmitting side is either the eigenmode propagation in the single-user MIMO (SU-MIMO) or the Zero Forcing THP method in the multi-user MIMO (MU-MIMO). In this specification, in addition to the above-described methods, as the reception Zero Forcing in the SU-MIMO and the reception MMSE in the SU-MIMO, the information by which the implemented signal processing method can be specified is used. The slot number 1247 specifies in which slot of the frame the data signal is actually to be transmitted. Also, the notification is carried out with set information of an ID of the used antenna. At this time, a system is required, in which the IDs can be identified even when the plurality of antennas are used across the plurality of base stations.

The receiving beamforming information 1249 is used when, for example, the terminal is notified of the result of the receiving-side beamforming matrix which is calculated on the transmitting side in the multi-user MIMO signal processing. For example, not only for the Zero Forcing THP method but also for a case that GDFE (General Decision Feedback Equalizer) in Non-Patent Document is utilized, it is required to set the receiving beamforming matrix of the terminal by the transmitting side. In this case, as same as the method of carrying out the notification with the codebook index which indicates the matrix closest to the V on the receiving side in order to specify the transmitting-side beamforming matrix V in the eigenmode propagation in the SU-MIMO signal processing, a codebook for the receiving beamforming weight matrix may be prepared, and the notification with its codebook index may be carried out.

Figure 13:
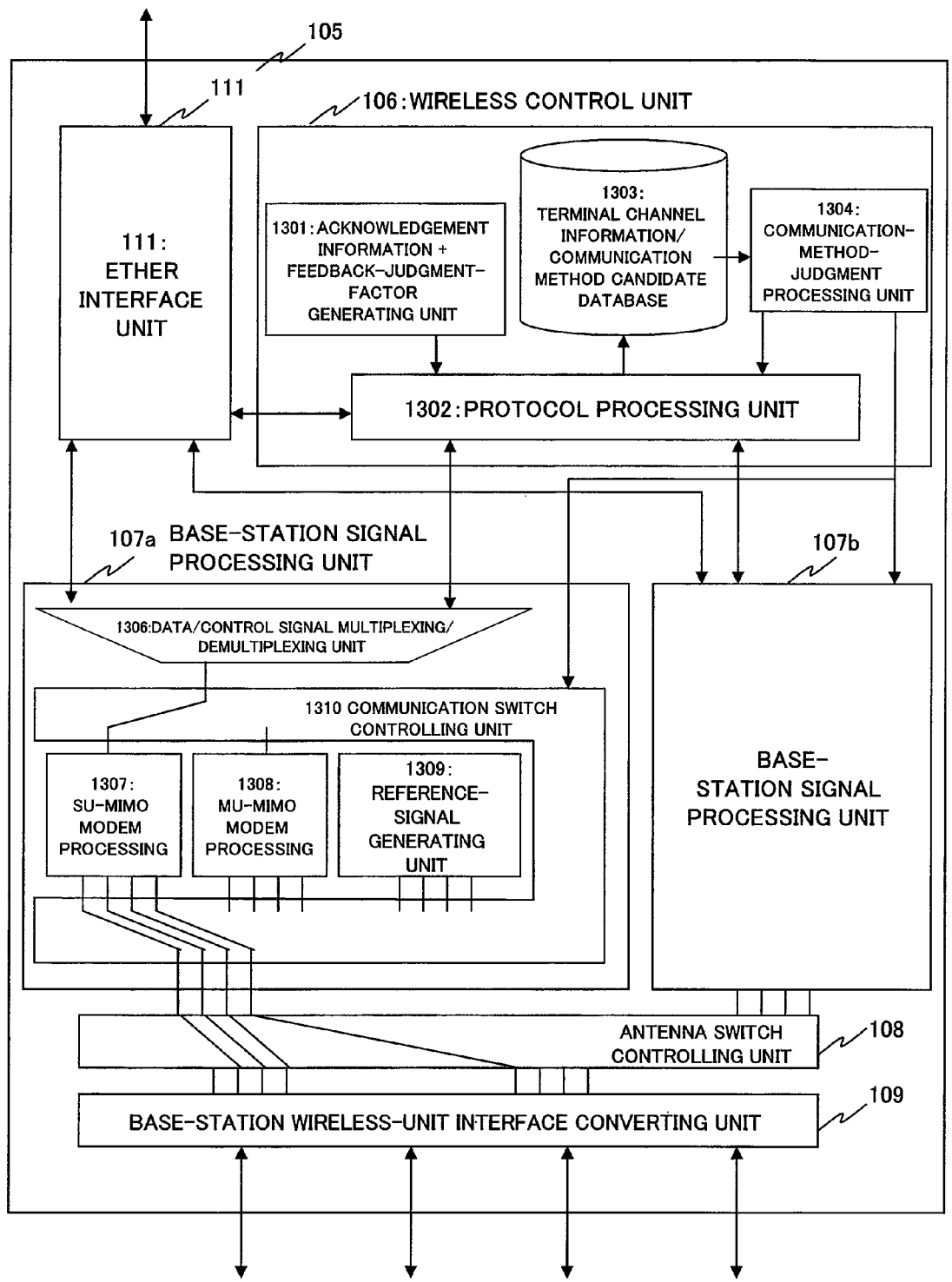
FIG. 13 is an explanatory diagram of a configuration of a super base station according to the embodiment of the present invention.

With reference to FIG. 13, a configuration of the integrated base station 105 according to the embodiment of the present invention is explained. The integrated base station 105 includes: a wireless control unit 106; one or more base-station signal processing units 107a/107b; an antenna switching control unit 108; a base-station wireless-unit interface converting unit 109; and an Ether interface unit 111. First, the Ether interface unit carries out a packet decomposition/composition processing on Ethernet which has been transmitted from a gateway device or others, reads header information, and carries out a data sorting processing with using an IP address or MAC address. The data whose destination is an address of the integrated base station 105 is regarded as the control signal to the control unit 106. When the data is sorted to the inter-base-station signal processing unit 107a or 107b, the control unit 106 sequentially sets a table indicating a relation of connecting which destination of the data signal with which one of the base-station wireless units 110a and 110b, for the Ether interface unit 111. The Ether interface unit 111 can sort the data signal to the base-station wireless unit 110a or 110b with reference to the table.

The base-station signal processing unit 107a includes: a data/control signal multiplexing/demultiplexing unit 1306 which carries out multiplexing/demultiplexing processing for the data signal and the control signal; a SU-MIMO modem processing unit 1307 which carries out the above-described single-user MIMO signal processing and a modem processing such as encoding/decoding processing and modulation/demodulation; a MU-MIMO modem processing unit 1308 which carries out the above-described multi-user MIMO signal processing and a modem processing such as encoding/decoding processing and modulation/demodulation; a reference-signal generating unit 1309; and a communication switching control unit 1310. Here, in the SU-MIMO modem processing unit 1307 and the MU-MIMO modem processing unit 1308, the modem processing such as encoding/decoding processing and modulation/demodulation which is a common content may be configured not in different modules but in one block. In the base-station signal processing unit 107a, first, the data/control signal multiplexing/demultiplexing unit 1306 carries out the multiplexing/demultiplexing processing for the data signal from the Ether interface unit 111 and the control signal for the wireless control unit 106. In response to the result of judging either the single-user MIMO processing or the multi-user MIMO processing in a communication-method judgment processing unit 1304 of the wireless control unit 106, the communication switching control unit 1310 carries out the switching so as to connect the SU-MIMO modem processing unit 1307 or the MU-MIMO modem processing unit 1308 to the data/control signal multiplexing/demultiplexing unit 1306 and the antenna switching control unit 108. Also, when the integrated base station 105 generates and transmits the reference signal, it carries out the switching so as to connect the reference-signal generating unit 1309 to the antenna switching control unit 108 at the transmission timing of the reference signal. The antenna switching control unit 108 carries out the switching so as to connect the inter-base-station signal processing units 107a or 107b to the respective antenna of the base-station wireless units 110a or 110b as described above. Their details will be described later with reference to FIG. 14. The base-station wireless unit interface converting unit 109 has a converting function into a communication standard format for connecting between the base-station wireless unit 110a/110b and the integrated base station 105. For example, it has an interface converting function which is compatible with CPRI (Common Public Radio Interface) connection or others by optical connection.

The wireless control unit 106 includes: an acknowledgement-information+feedback-judgment-information generating unit 1301; a protocol processing unit 1302; the communication-method judgment processing unit 1304; and the terminal channel-information/communication-method-candidate database 1303. The acknowledgement-information+feedback-judgment-information generating unit 1301 generates the control signal described in FIG. 12, and passes the signal to the protocol processing unit 1302. The protocol processing unit 1302 carries out the transmission/reception processing for the control signal in accordance with the protocol described in FIGS. 10 and 11. By the protocol processing, the data of the channel information and the communication method candidate collected from the terminals is stored in the terminal channel-information/communication-method-candidate database 1303. The database has a structure in which the channel information and the communication method candidate can be extracted by using the ID of the terminal as a search key. By using the terminal channel-information/communication-method-candidate database 1303, the communication-method judgment processing unit 1304 determines the communication method in accordance with an algorithm which will be described later in FIG. 15. The determined communication method is passed to the protocol processing unit 1302, and each of the terminals is also notified of the communication method together with the scheduling information as the communication method information as explained in FIG. 11. Also, in order to execute the transmission/reception modem processing in accordance with the determined communication method, the SU-MIMO modem processing unit 1307 or the MU-MIMO modem processing unit 1308 is switched by the notification to the communication switching control unit 1310 of the base-station signal processing unit 107a.

Figure 14:
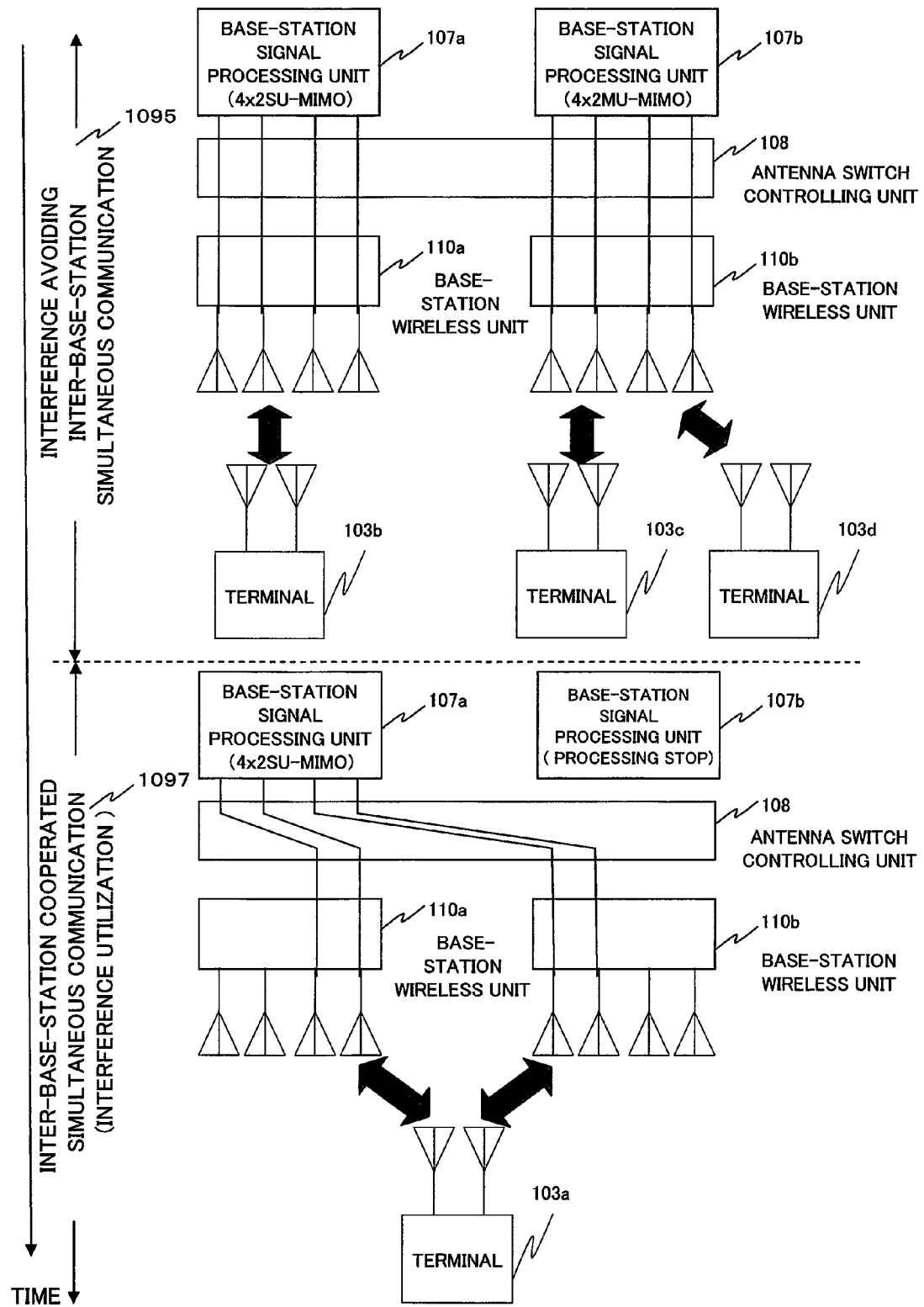
FIG. 14 is an explanatory diagram of an operation of an antenna switching control unit of the super base station.

With reference to FIG. 14, an operation of the antenna switching control unit 108 is explained. This example describes a state that the antenna switching control unit 108 carries out the connection switching as dividing the frame into the time period 1095 for the interference avoiding inter-base-station simultaneous communication and the time period 1097 for the inter-base-station coordinated simultaneous communication (interference utilization).

First, in the time period 1095 for the interference avoiding inter-base-station simultaneous communication, the single-user MIMO communication is carried out between the base-station wireless unit 110a and the terminal 103b, and, in the same time period, the multi-user MIMO communication is carried out between the base-station wireless unit 110b and the plurality of terminals of the terminal 103c and the terminal 103d at the same time. In this case, the interference influence of the electric waves which are transmitted from the base-station wireless unit 110a on the terminals 103c and 103d is low, and, conversely, the interference influence of the electric waves which are transmitted by the base-station wireless unit 110b on the terminal 103b is small, so that the simultaneous communication can be achieved. For example, as the case, it is assumed that the sufficiently large desired wave can be obtained because the terminal 103b is close to the base-station wireless unit 110a and the terminals 103c and 103d are close to the base-station wireless unit 110b. At this time, the antenna switching control unit 108 carries out the switching so as to connect the SU-MIMO modem processing unit 1307 of the base-station signal processing unit 107a to the four antennas of the base-station wireless unit 110a and connect the MU-MIMO modem processing unit 1308 of the base-station signal processing unit 107b to the four antennas of the base-station wireless unit 110b.

Next, the time period 1097 for the inter-base-station coordinated simultaneous communication (interference utilization) is explained. At this time, the single-user MIMO communication is carried out to the terminal 103a with using two antennas of the base-station wireless unit 110a and two antennas of the base-station wireless unit 110b. At this time, the antenna switching control unit 108 carries out the switching so as to connect the four outputs of the SU-MIMO modem processing unit 1307 of the base-station signal processing unit 107a to the two antennas of the base-station wireless unit 110a and the two antennas of the base-station wireless unit 110b. In this manner, for example, the antenna which can effectively use the terminal 103a at the cell border is selected, and the antenna switching control unit 108 switches the connection mode, so that the single-user MIMO processing can be achieved.

Figure 15:
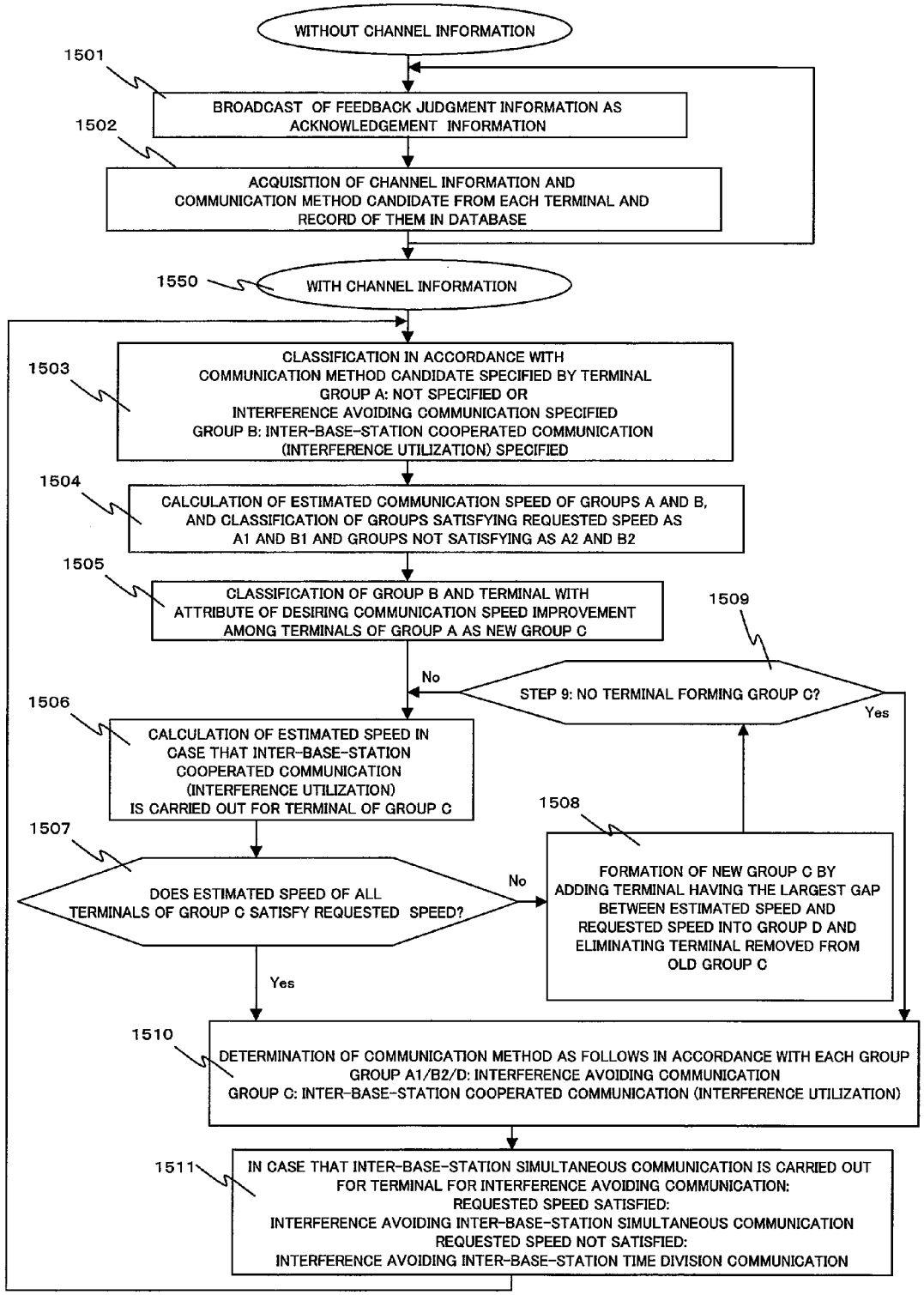
FIG. 15 is a diagram showing a flowchart of a control unit of the super base station.

FIG. 15 shows a flow chart of the processing carried out by the wireless control unit 106 of the integrated base station 105. Immediately after power is turned on or after the reset, the wireless control unit 106 is in a state without the terminal channel-information/communication-method-candidate database. Accordingly, first, the acknowledgement-information+feedback-judgment information generating unit 1301 generates the feedback judgment information, and broadcasts the information to the terminals as the acknowledgement information (1501). This state corresponds to 1010a and 1010b in FIG. 10. In the wireless control unit 106, the protocol processing unit 1302 receives the channel information and the communication method candidate from each terminal as the control signal, and records the information in the terminal channel-information/communication-method-candidate database 1303 (1502). In this manner, the database is in a storing state. After this, the protocol processing unit 1302 periodically repeats the broadcasting processing 1501 of the feedback judgment information and the acknowledgement information and the updating processing 1502 of the channel information and the communication method candidate collected from each terminal in the terminal channel-information/communication-method-candidate database 1303. If the information is changed, the acknowledgement-information+feedback-judgment-information generating unit 1301 carries out a changing operation. If the information is not changed, the unit periodically broadcasts the same information.

And, the communication-method judgment processing unit 1304 references the terminal channel-information/communication-method-candidate database 1303. If a state with the channel information is provided (1550), the terminals are divided into the following two groups (1503) in accordance with the communication method candidate specified by the terminal. If the terminals have not specified the communication method, if the communication method specifying information from the terminals has not been acquired, or if the terminals have specified the interference avoiding communication, a group of them is A. If the terminals have specified the inter-base-station coordinated communication (interference utilization), a group of them is a B group. Next, the communication-method judgment processing unit 1304 obtains an estimated communication speed of the terminals of the group A (1504). First, a communication capacity in a single carrier "f" is obtained by the following equation 19.

$$V_A(f) = \frac{\log_2\left(1 + \frac{S}{I+N}\right)}{n_A} \quad \text{(Equation 19)}$$

Here, from the reference signal which is transmitted from the tributary base-station transmitting antenna, the received electric power of the desired wave when the transmitting antenna providing the desired wave is selected is defined as S, and the received electric power of the reference signal which is transmitted from the transmitting antenna not providing the desired wave but to be contributed as the interference from the transmitting antenna of the tributary base station and the received electric power of the reference signal which is transmitted from the other base-station antenna than that of the tributary base station are defined as "I". A symbol "N" represents electric power of the thermal noise, and represents the electric power obtained after noise intensification which is after the gaussian noise signal is subjected to the beamforming processing on the receiving side. A symbol "$n_A$" represents the total number of the terminals belonging to the group A.

By comparing the $V_A(f)$ which is obtained by the equation 19 with the number of bits which can be actually transmitted by using modulation level (multiple value), the information amount which can be transmitted by this sub carrier is obtained. For example, if the $V_A(f)$ is 6.8 bit/s/Hz, a signal whose number of bits is up to 6 bit/s/Hz can be transmitted by using 64 QAM. The sum of this transmittable information amount for all sub carriers is obtained, and the sum is assumed as the estimated communication speed.

Next, how to obtain the estimated communication speed of the group B is explained. First, a communication capacity in a case that the inter-base-station coordinated communication is carried out by a sub carrier "f" is obtained. The definition of S, I, and N is similar to that of the equation 19. A symbol "$n_B$" represents the total number of the terminals belonging to the group B.

$$V_B(f) = \frac{\log_2\left(1 + \frac{S+I}{N}\right)}{n_B} \quad \text{(Equation 20)}$$

It is compared whether the obtained estimated communication speed of each of the terminals satisfies the requested speed or not. In the group A, a group of terminals whose estimated communication speed satisfy the requested speed is assumed as "A1", and a group of terminals whose speed do not satisfy that is assumed as "A2". In the group B, a group of terminals whose estimated communication speed satisfy the requested speed is assumed as "B1", and a group of terminals whose speed do not satisfy that is assumed as "B2".

Next, in 1505, in the communication-method judgment processing unit 1304, terminals which expect the communication speed improvement among the terminals of the group A2 and the terminals of the group B1 are combined to form a group C. Here, regarding the judgment whether the communication speed improvement is expected or not, as explained in FIG. 12, by the notification of the information component of the communication speed improving intention with using the control signal of the channel information+the communication method candidate from the terminal, the judgment is recorded in the terminal channel-information/communication-method-candidate database 1303 of the integrated base station 105.

In 1506, the estimated communication speed is obtained for the newly-formed group C.

Similarly to the equation 20, a communication capacity in a case that the inter-base-station coordinated communication is carried out by a sub carrier "f" is obtained.

$$V_C(f) = \frac{\log_2\left(1 + \frac{S+I}{N}\right)}{n_C} \quad \text{(Equation 21)}$$

In 1507, it is judged whether the estimation communication speeds of all of the terminals of the group C satisfy the requested communication speed or not. If satisfied, the procedure proceeds to 1510. If not satisfied, the procedure proceeds to 1508. In 1508, one terminal having the largest difference between the estimated communication speed and the requested communication speed is selected, and is added to a group D. The group C from which the selected one terminal is excluded is assumed as a new group C. In 1509, the number of the terminals forming the new group C is checked. If there is no forming terminal at all, the procedure returns to 1510. If there is one or more, the procedure returns to 1506, so that the estimated communication speed in the new group C is calculated again. In this manner, the communication-method judgment processing unit 1304 carries out the loop processing from 1506 to 1509, and determines the group C of the terminals which satisfy the requested communication speed in the inter-base-station coordinated communication.

In 1510, the communication-method judgment processing unit 1304 determines the communication methods so that the inter-base-station coordinated communication is carried out for the group C and the interference avoiding communication is carried out for the groups A1, B2, and D other than that.

In 1511, the communication-method judgment processing unit 1304 arbitrarily combines terminals among the terminals for which the interference avoiding communication is determined to be carried out, so as to determine that the interference avoiding communication by the inter-base-station simultaneous transmission is to be carried out for the terminals which satisfy the requested communication speed even in the simultaneous transmission between the base stations and that the interference avoiding communication by the inter-base-station time division is to be carried out for the terminals which do not satisfy the requested speed.

It is newly defined that the groups A1, B2, and D are in a group E. It is assumed that a terminal group for which the simultaneous communication is carried out is arbitrarily formed as E1, and that the others are as E2. A communication capacity of a sub carrier "f" is obtained by the following equation 22, and the estimated communication speed is obtained as similarly to the above description.

$$V_E(f) = \frac{\log_2\left(1 + \frac{S}{I+N}\right)}{(1+n_{E2})} \quad \text{(Equation 22)}$$

Note that, here, regarding a symbol "I" of the interference term, if the beamforming is carried out on the transmitting side for each of the terminals of the group E1 for which the simultaneous communication is carried out, electric power affecting other terminals as the interference after the beamforming is calculated.

After 1511, the procedure returns to 1503. In this manner, with referencing the terminal channel-information/communication-method-candidate database 1303, the communication-method judgment processing unit 1304 repeats the judgment of the communication method periodically or in an event driven method as such when the information update is provided from the terminal. This procedure corresponds to 1090 of FIG. 10.

Figure 16:
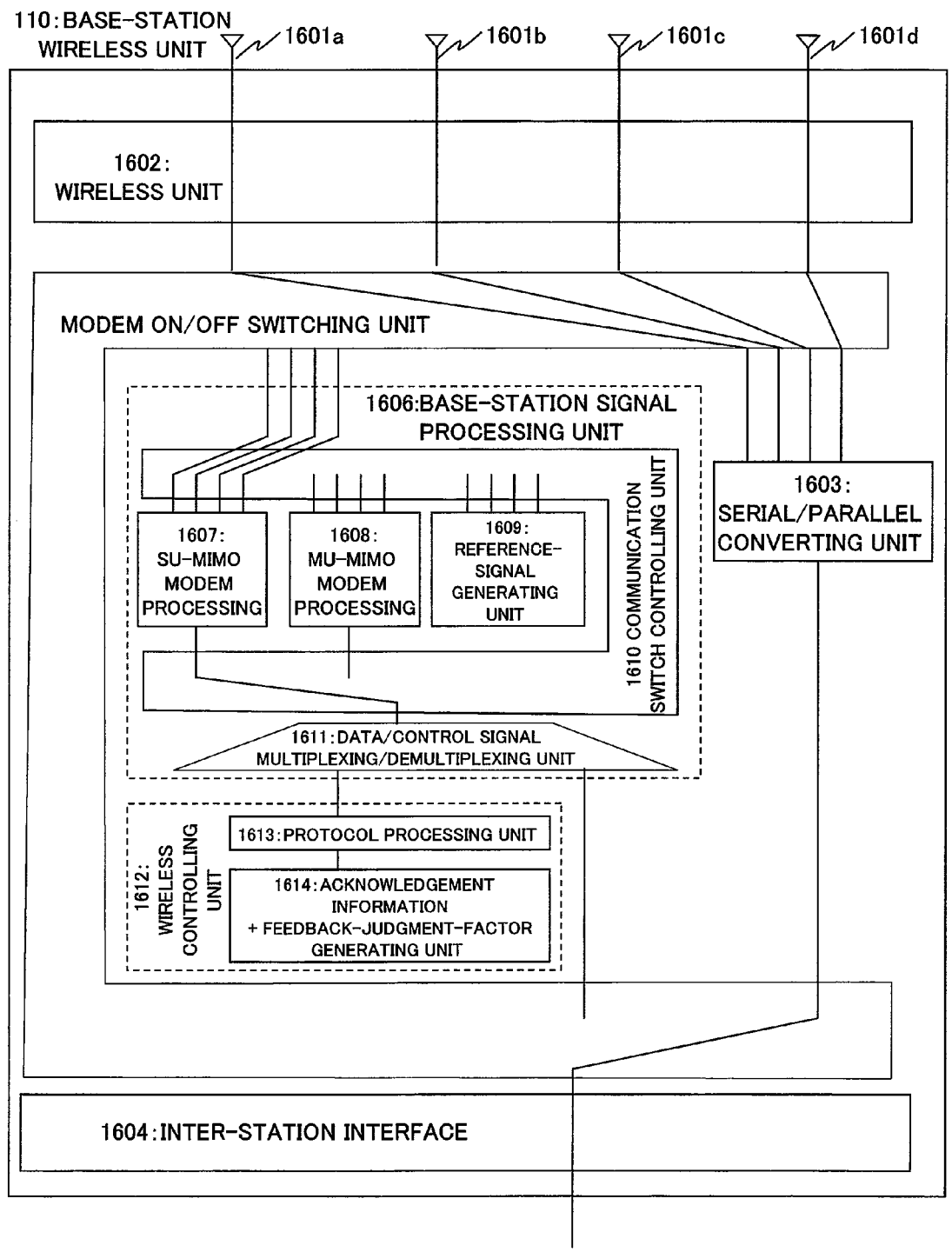
FIG. 16 is an explanatory diagram of a configuration of a base-station wireless unit according to the embodiment of the present invention.

FIG. 16 shows a configuration diagram of the base-station wireless unit according to the embodiment of the present invention. The base-station wireless unit includes: one or more antennas 1601a, 1601b, 1601c, and 1601d; a wireless unit 1602; a serial/parallel converting unit; and an inter-station interface unit 1604.

The wireless unit 1602 includes: a duplexer having a transmission/reception switching function at each of the antennas 1601a, 1601b, 1601c, and 1601d; and a receiver and a transmitter connected to the duplexer. The receiver carries out a filtering processing of the received signal from the antenna, and converts the signal into an analog baseband signal, and then, converts the signal into a digital signal (A/D conversion), and outputs the signal to the serial/parallel converting unit 1603. On the other hand, the transmitter has a function of converting a digital signal, which is output from the serial/parallel converting unit 1603, into an analog signal (D/A conversion), and carrying out conversion of the frequency band and electric power amplification, and then, outputting the signal to the duplexer. The serial/parallel converting unit 1603 carries out a serial/parallel conversion processing in order to pass the signals of the four antennas to the inter-station interface unit 1604. The inter-station interface unit 1604 carries out the packet decomposition/composition processing or others for carrying out the communication with the integrated base station 105, the base-station control station 101a, the other base-station wireless unit 110b, the other base station 102a, and others.

The above description is for the simplest configuration of the base-station wireless unit. However, a configuration in which this base-station wireless unit includes the base-station signal processing unit 1606 and the wireless control unit 1612 may be employed.

In this case, a modem ON/OFF switching unit 1605 connects between the wireless unit 1602 and the base-station signal processing unit 1606 instead of between the wireless unit 1602 and the serial/parallel converting unit 1603 so that the connection of the output of the base-station signal processing unit is switched to the inter-station interface unit 1604.

The functions of the base-station signal processing unit 1606 and the wireless control unit 1612 are basically equivalent to the functions of the base-station signal processing unit 107a and the wireless control unit 106 of the super base station. However, the base-station signal processing unit 1606 carries out the single-user MIMO or multi-user MIMO signal processing only for the antennas 1601a, 1601b, 1601c, and 1601d of the base-station wireless unit. That is, it can carry out the signal processing only for the tributary terminals of the base-station wireless unit. It cannot carry out the inter-base-station coordinated communication, and only supports the interference avoiding communication. Also, the wireless control unit 1612 has a function of acknowledging the acknowledgement information and the feedback judgment information in place of the super base station. The judgment of the communication method is not carried out in this wireless control unit 1612 because it cannot sufficiently have the factors for judging the communication method from the terminal. When they are functioned as a single base station if the integrated base station 105 does not exist, the station supports the single-user MIMO and multi-user MIMO communication functions as a similar station to the conventional base station. Note that it is assumed that the function configuring the wireless control unit 106 exists in the integrated base station 105. However, any of the base stations may have the function corresponding to the wireless control unit 106 and carry out the judgment of the communication method of the terminal. Alternatively, the base-station control station 101a may configure the wireless control unit 106, and control the plurality of base stations to control the cooperation between the base stations.

Figure 17:
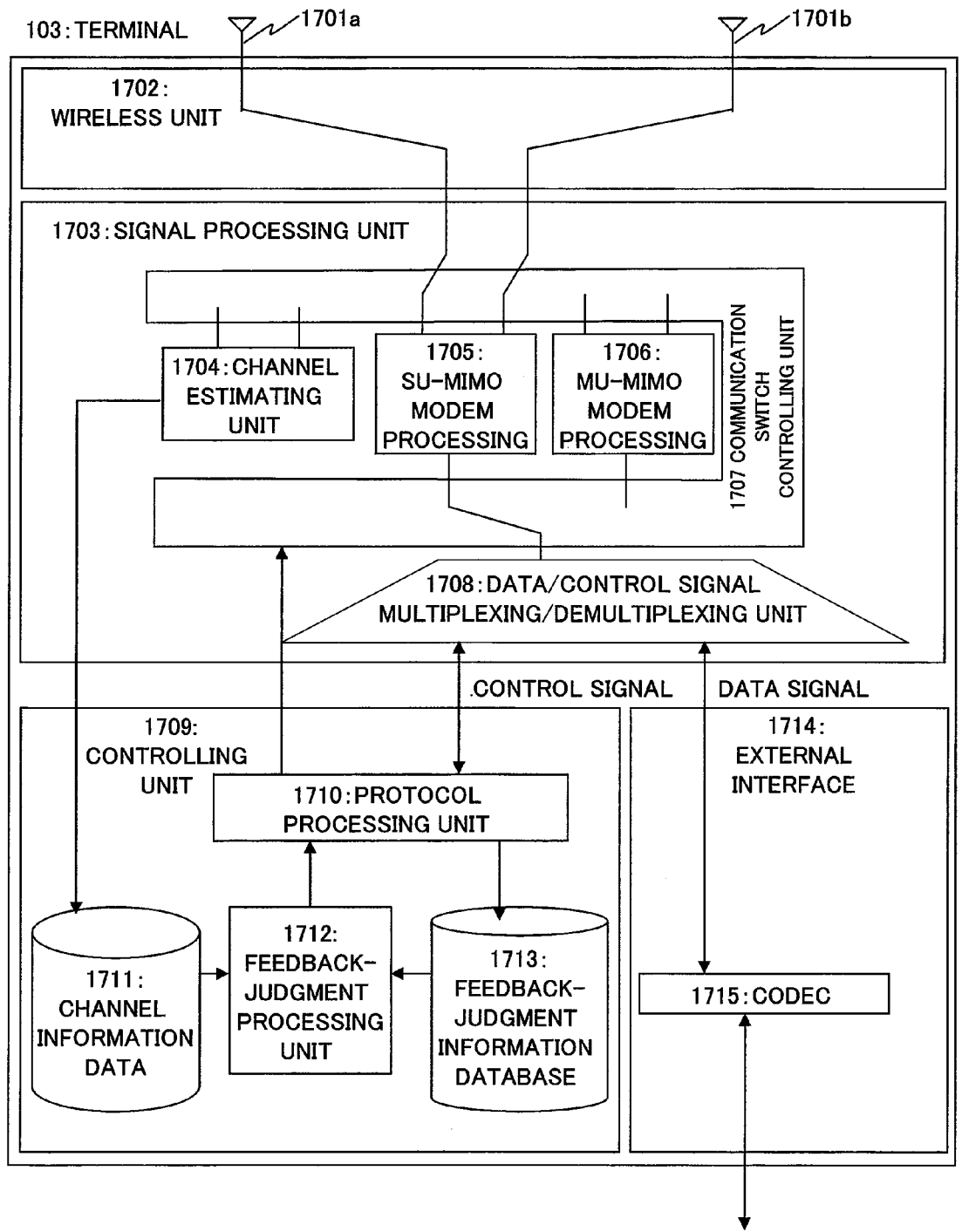
FIG. 17 is an explanatory diagram of a configuration of a terminal according to the embodiment of the present invention.

FIG. 17 shows a configuration diagram of the terminal according to the embodiment of the present invention. The terminal includes: one or more antennas 1701a and 1701b; a wireless unit 1702; a signal processing unit 1703; a control unit 1709; and an external interface 1714. The wireless unit 1702 has a configuration similar to that of the wireless unit 1602 in the base-station wireless unit. The signal processing unit 1703 includes: a channel estimating unit 1704; an SU-MIMO modem processing 1705; an MU-MIMO modem processing 1706; a communication switching control unit 1707; and a data/control signal multiplexing/demultiplexing unit 1708.

Other units than the channel estimating unit 1704 have the functions equivalent to those of the base-station signal processing unit of the integrated base station 105 or the base-station wireless unit 110a. In the channel estimating unit 1704, when the reference signal is received, a gain between the antennas of the propagation path can be measured since the already-known signal is used in the pattern of the reference signal. A propagation path gain between the transmitting antenna and the receiving antenna is measured as a channel matrix, and a result of the measurement is stored in a channel information data 1711 of the control unit 1709. The function of the channel estimating unit 1704 may exist in the base-station signal processing unit of the integrated base station 105 or the base-station wireless unit 110a. In that case, the reference signal is transmitted from the terminal side, and the channel information received by the base-station wireless unit can be measured.

The control unit 1709 includes: a protocol processing unit 1710; the channel information data 1711 of the channel estimation result; a feedback judgment processing unit 1712; and feedback judgment information 1713. The control unit 1709 has a function of determining whether the feedback transmission is to be carried out or not based on the channel information data 1711 and the feedback judgment information 1713 and determining the communication method candidate in the feedback by the feedback judgment processing unit 1712 in accordance with an algorithm described later in FIG. 18, and communicating the control signal with the integrated base station 105 or the base-station wireless unit 110a in accordance with the protocols of FIGS. 10 and 11. The external interface 1714 has an interface function of connection to, for example, a microphone, a speaker, or others as, for example, an input/output device at the terminal. For example, a codec 1715 plays a role of, for example, external interface conversion as an audio terminal or a data communication terminal by carrying out an audio codec processing or a codec processing of data communication.

Figure 18:
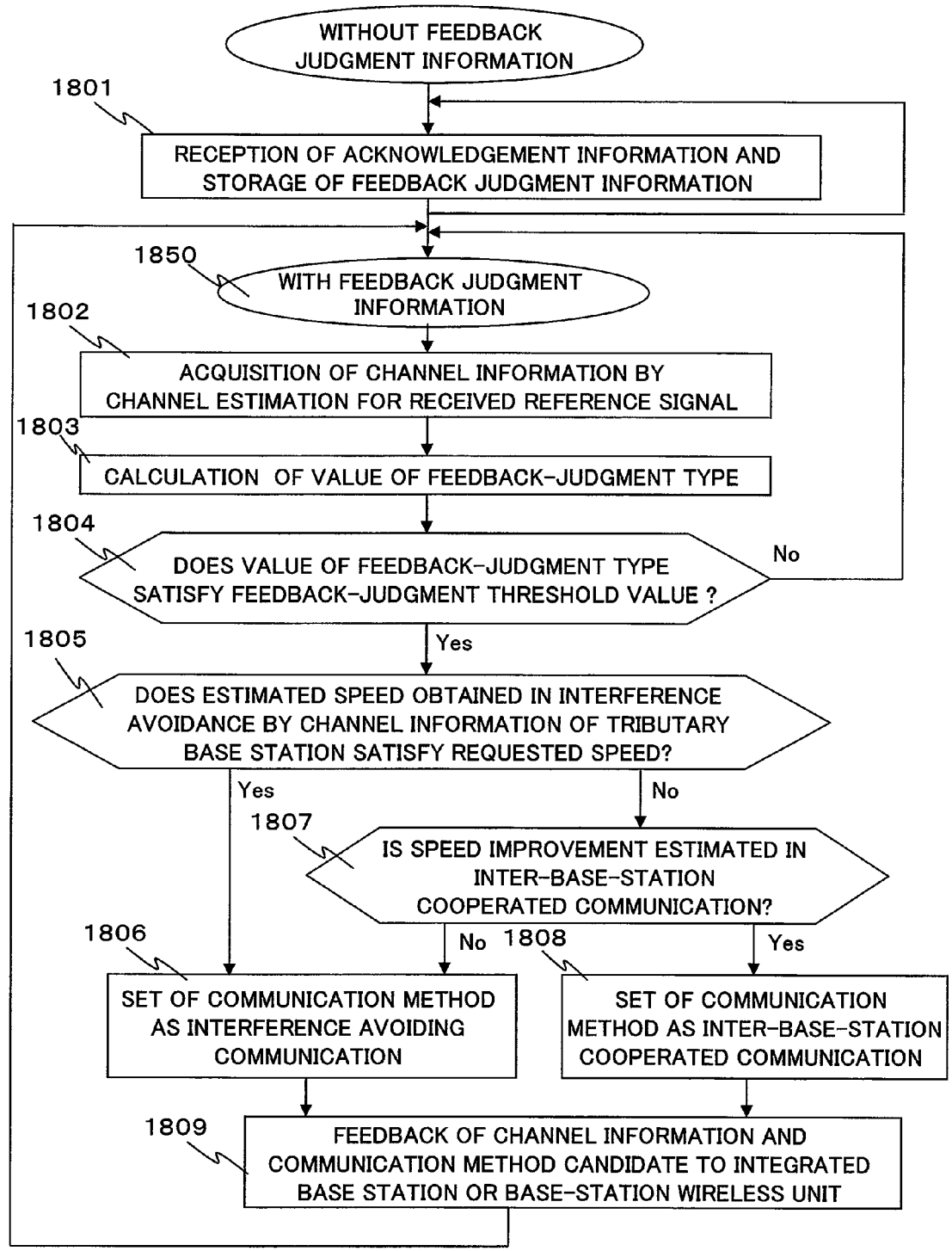
FIG. 18 is a diagram showing a flowchart of a control unit of the terminal.

With reference to FIG. 18, a flowchart executed by the control unit of the terminal is explained. In FIG. 18, 1050, 1060, 1070, and 1080 of FIG. 10 are handled. Also, 1123, 1143, 1153, 1155, and 1157 of FIG. 11 are handled.

The powered-on terminal has not received the acknowledgement information yet, and the procedure begins from a state without the feedback judgment information. Accordingly, in 1801, the acknowledgement information is received and saved in a database as the feedback judgment information 1713. This acknowledgement information is periodically broadcasted, and therefore, the protocol processing unit 1710 periodically receives the information, and carries out the processing of appropriately updating the feedback judgment information. If the feedback judgment information is in the database (1850), in 1802 and subsequent steps, the feedback judgment information is obtained, and the feedback judgment processing unit 1712 determines whether the feedback is to be carried out or not and determines the communication method candidate. In 1802, the reference signal is received, the channel information is estimated by the channel estimating unit 1704, and a result of the estimation is stored as the channel information data 1711. In 1803, the feedback judgment information is referenced to check the feedback judgment type. By the feedback judgment type, numerical values such as the channel variation correlation coefficient, the decoding error rate, the SINR from all of the base stations, the SINR from the tributary base stations, and the improving index in the inter-base-station coordinated communication described above in FIG. 12 are calculated. Although the improving index in the inter-base-station coordinated communication has the plurality of candidates as expressed by the equations 17 and 18, each index can be specified by using a different value for the feedback judgment type.

In 1804, it is judged whether the calculation result of the above-described numerical value satisfies the condition of the feedback judgment threshold value or not. If the condition of the feedback judgment threshold value is not satisfied, the terminal does not transmit the feedback information, and the procedure returns to 1802. If the condition of the feedback judgment threshold value is satisfied, the procedure proceeds to 1805.

In 1805, the estimated communication speed in a case that the interference avoiding communication is carried out is obtained from the channel information from the tributary base station to judge whether the estimated communication speed satisfies the requested communication speed or not. Here, how to obtain the estimated communication speed is described. First, a communication capacity in a single carrier "f" is obtained by the following equation 23.

$$V(f) = \frac{\log_2\left(1 + \frac{S}{I+N}\right)}{n}$$ (Equation 23)

Here, from the reference signal which is transmitted from the tributary base-station transmitting antenna, the received electric power of the desired wave when the transmitting antenna providing the desired wave is selected is defined as S, and the received electric power of the reference signal which is transmitted from the transmitting antenna not providing the desired wave but to be contributed as the interference from the transmitting antenna of the tributary base station is defined as I. A symbol "N" represents electric power of the thermal noise, and represents the electric power obtained after noise intensification which is after the gaussian noise signal is subjected to the beamforming processing on the receiving side. A symbol "n" represents the total number of the terminals belonging to the tributary base station.

By comparing the V(f) obtained by the equation 23 with the number of bits which can be actually transmitted by a modulation level, the information amount which can be transmitted by this sub carrier is obtained. The sum of this transmittable information amount is obtained for all of sub carriers, and the sum is assumed as the estimated communication speed.

If the estimated communication speed satisfies the requested communication speed in 1805, the communication method is set to the interference avoiding communication in 1806. If the estimated communication speed does not satisfy the requested communication speed, the procedure proceeds to 1807. If the speed improvement in the inter-base-station coordinated communication is expected in 1807, the communication method is set to the inter-base-station coordinated communication in 1808. If the speed improvement is not expected, the communication method is set to the interference avoiding communication in 1806. After the candidate of the communication method is determined in 1806 or 1808, the procedure proceeds to 1809. In 1809, the control signal described in FIG. 12 is generated, and the communication method candidate and the channel information are fed back for the notification to the super base station or the base-station wireless unit in accordance with the protocol procedure.

Also, regarding the improving index in the inter-base-station coordinated communication, if the communication capacity in the sub carrier is flat in the equations 17 and 18 or others, it may be judged to use the communication capacity as the index. However, if a property is different in each sub carrier, the improving index may be calculated by using the estimated communication speed with using all of sub carriers.

For the estimated communication speed in the case that the inter-base-station coordinated communication is carried out, by calculating the communication capacity of the sub carrier by the equation 16 and comparing the communication capacity with the number of bits which can be actually transmitted by using modulation level, the information amount which can be transmitted by this sub carrier is obtained. The sum of this transmittable information amount for all sub carriers is obtained, and the sum is assumed as the estimated communication speed in the inter-base-station coordinated communication.

On the other hand, for the estimated communication speed in the case that the inter-base-station coordinated communication is not carried out, by comparing the communication capacity obtained by the equation 23 with the number of bits which can be actually transmitted by using modulation level, the information amount which can be transmitted by this sub carrier is obtained. The sum of this transmittable information amount for all sub carriers is obtained, and the sum is assumed as the estimated communication speed in the case that the inter-base-station coordinated communication is not carried out.

As the improving index in the inter-base-station coordinated communication, a ratio of the estimated communication speed in the case that the inter-base-station coordinated communication is carried out with respect to the estimated communication speed in the case that the inter-base-station coordinated communication is not carried out, an absolute value of a difference between the estimated communication speed in the case that the inter-base-station coordinated communication is carried out and the estimated communication speed in the case that the inter-base-station coordinated communication is not carried out, or a value obtained by dividing the above-described absolute value by the estimated communication speed in the case that the inter-base-station communication is not carried out may be utilized.

INDUSTRIAL APPLICABILITY

The present invention can be used for a method of carrying out data transmission/reception between a plurality of base stations having a plurality of transmitting/receiving antennas and a plurality of tributary terminals of the respective base stations in a wireless communication system.

The invention claimed is:

1. A wireless communication system including a plurality of base stations having a plurality of antennas, and a plurality of terminals having a plurality of antennas, the wireless communication system comprising:
dividing means for dividing a frame time into:
a first time period for time division multiplex communication divided into a time of communication between a base station of the plurality of base stations and a terminal of the plurality of terminals and a time of communication between another base station of the plurality of base stations and a terminal of the plurality of terminals, so as to avoid interference between the plurality of base stations,
a second time period for interference avoiding simultaneous communication which is in a spatially-divided state, wherein communication between a base station of the plurality of base stations and one terminal and another base station of the plurality of base stations and a second terminal is simultaneously performed so that mutual interference between the plurality of base stations is negligibly small even when the plurality of base stations transmit signals at the same time; and
a third time period for coordinated communication in which a base station and another base station of the plurality of base stations simultaneously communicate with a terminal, wherein at least one of the base station and the another base station uses a signal processed by a signal processing unit of an integrated base station to communicate with the terminal,
collecting means for collecting channel information between at least one of an antenna of a terminal and the antenna of a base station and an antenna of a terminal and an antenna of the integrated base station,
determining means for judging whether an estimated communication speed in each communication method calculated from the collected channel information satisfies a requested speed of the terminal or not and determining a communication method for the integrated base station, and
communication means for, at the integrated base station, carrying out communication with the terminal via the base station in the time period to which the determined communication method is allocated.

2. The wireless communication system according to claim 1, wherein
at least one of the base station or the integrated base station includes:
a means for transmitting, from the respective antenna of the base station, a reference signal with an already-known pattern required for measuring the channel information between a transmitting antenna and a receiving antenna at the terminal; and
a means for notifying the terminal of information for specifying a feedback method which indicates how the terminal feeds back the channel information, and
the terminal measures the channel information by the reference signal, judges whether the measured channel information is fed back or not in accordance with the information for specifying the feedback method, and feeds back the channel information to the base station or the integrated base station based on a result of the judgment.

3. The wireless communication system according to claim 2, wherein
in the information for specifying the feedback method, only a terminal which has a certain value or larger in a ratio of an estimated communication speed in a case that the inter-base-station coordinated communication is carried out with respect to an estimated communication speed in a case that the inter-base-station coordinated communication is not carried out, feeds back the channel information.

4. The wireless communication system according to claim 2, wherein
in the information for specifying the feedback method, only a terminal which has a certain value or larger in an absolute value of a difference between an estimated communication speed in a case that the inter-base-station coordinated communication is carried out and an estimated communication speed in a case that the inter-base-station coordinated communication is not carried out, feeds back the channel information.

5. The wireless communication system according to claim 2, wherein
in the information for specifying the feedback method, only a terminal which has a certain value or larger in a value obtained by dividing an absolute value of a difference between an estimated communication speed in a case that the inter-base-station coordinated communication is carried out and an estimated communication speed in a case that the inter-base-station coordinated communication is not carried out by the estimated communication speed in the case that the inter-base-station coordinated communication is not carried out, feeds back the channel information.

6. An integrated base station connected to a plurality of base stations which carry out a wireless communication with a plurality of terminals, the integrated base station comprising:
a receiving unit which receives communication-method specification request information for specifying a communication method requested by the terminal, from each of the plurality of the terminals;
a determining unit which calculates a communication speed between the terminal and each of the plurality of base stations, and determining a communication method corresponding to the communication speed, based on communication-method specification request information;
a dividing unit which divides a frame into:
a first time period for integrated base station time division multiplex communication divided into a time of communication between a base station of the plurality of base stations and a terminal of the plurality of terminals and a time of communication between the integrated base station of the plurality of base stations and a terminal of the plurality of terminals, so as to avoid interference between the plurality of base stations,
a second time period for interference avoiding integrated base station simultaneous communication which is in a spatially-divided state wherein communication between a base station of the plurality of base stations and one terminal and an integrated base station of the plurality of base stations and a second terminal is simultaneously performed so that mutual interference between the plurality of base stations is negligibly small even when the plurality of base stations transmit signals at the same time, and
a third time period for integrated bases station coordinated communication in which a base station and an integrated base station of the plurality of base stations simultaneously communicate with a terminal, wherein at least one of the base station and the integrated base station uses a signal processed by a signal processing unit of the integrated base station to communicate with the terminal,
a notifying unit which notifies each of the terminals via the base station of the determined communication method; and
a communication unit that communicates with the terminal via the base stations in the time period to which the determined communication method is allocated.

7. The integrated base station according to claim 6, wherein the integrated base station further includes:
a grouping unit which groups the plurality of terminals based on the calculated communication speed,
wherein the determining unit determines the communication method for each group.

8. The integrated base station according to claim 6, wherein the determining unit selects any of the communication methods of integrated base station time division multiplex communication, interference avoiding integrated base station simultaneous communication, and interference utilizing integrated base station coordinated communication which are allocated to a first time period, the second time period, and the third time period, respectively.

9. The integrated base station according to claim 7, wherein the integrated base station further includes an allocation setting unit which sets a time period for carrying out a communication method.

10. The integrated base station according to claim 6, wherein
the receiving unit also receives channel information together with the communication-method specification request information.

11. A terminal which carries out a wireless communication with one or more base stations among a plurality of base stations connected to an integrated base station, the terminal comprising:
an acquiring unit which receives a reference signal from the one or more base stations and acquires channel information; and
a notifying unit which judges whether a predetermined condition is satisfied or not based on the channel information, and, if satisfied as a result of the judgment, the notifying unit notifies the base station of communication-method specification request information which contains specification of a communication method requested by the terminal,
wherein the terminal is in a system which comprising:
dividing means for dividing a frame time into:
a first time period for time division multiplex communication divided into a time of communication between a base station of the plurality of base stations and a terminal of the plurality of terminals and a time of communication between another base station of the plurality of base stations and a terminal of the plurality of terminals, so as to avoid interference between the plurality of base stations,
a second time period for interference avoiding simultaneous communication which is in a spatially-divided state, wherein communication between a base station of the plurality of base stations and one terminal and another base station of the plurality of base stations and a second terminal is simultaneously performed so that mutual interference between the plurality of base stations is negligibly small even when the plurality of base stations transmit signals at the same time; and
a third time period for coordinated communication in which a base station and another base station of the plurality of base stations simultaneously communicate with a terminal, wherein at least one of the base station and the another base station uses a signal processed by a signal processing unit of an integrated base station to communicate with the terminal,
collecting means for collecting channel information between at least one of an antenna of a terminal and the antenna of a base station and an antenna of a terminal and an antenna of the integrated base station,
determining means for judging whether an estimated communication speed in each communication method calculated from the collected channel information satisfies a requested speed of the terminal or not and determining a communication method for the integrated base station, and
communication means for, at the integrated base station, carrying out communication with the terminal via the base station in the time period to which the determined communication method is allocated.

12. The terminal according to claim 11, wherein
the terminal further includes:
a judging unit which, when the specification of the communication method is received from the integrated base station via the base station, judges whether the communication can be carried out by the specified communication method or not; and
a judgment-result notifying unit which notifies the integrated base station of a result of the judgment via the base station.

13. The terminal according to claim 11, wherein
the predetermined condition is contained in information which is received from the base station.

14. The terminal according to claim 11, wherein
wherein the judgment of whether a predetermined condition is satisfied includes the judgments of whether:
a channel correlation variation coefficient satisfies a first predetermined condition,
a decoding error rate satisfies a second predetermined condition,
a signal-to-interference-noise-ratio (SINR) from all the base stations satisfies a third predetermined condition,
a SINR from the base station satisfies a fourth predetermined condition, and
an improvement index related to integrated base station coordinated communication, which is a communication method, satisfies a fifth predetermined condition.

* * * * *